(12) United States Patent
Pearl et al.

(10) Patent No.: US 7,455,451 B2
(45) Date of Patent: Nov. 25, 2008

(54) TEST STRIP DISPENSER AND THERMOMETER HOLDER

(75) Inventors: Jayson G. Pearl, Shorewood, WI (US); Michael G. Young, Mukwonago, WI (US); Paul A. Omdoll, Waukesha, WI (US); Norman A. Falola, Ithaca, NY (US)

(73) Assignee: The Colman Group, Inc., Elkhorn, WI (US)

( * ) Notice: Subject to any disclaimer, the term of this patent is extended or adjusted under 35 U.S.C. 154(b) by 0 days.

(21) Appl. No.: 11/372,627

(22) Filed: Mar. 10, 2006

(65) Prior Publication Data

US 2006/0203878 A1     Sep. 14, 2006

Related U.S. Application Data

(60) Provisional application No. 60/661,045, filed on Mar. 11, 2005.

(51) Int. Cl.
*G01K 1/14* (2006.01)

(52) U.S. Cl. .............................. 374/141; 374/208; 374/1

(58) Field of Classification Search ................. 374/141, 374/208, 1; 73/60.11, 61.41, 61.52, 61.54; 436/162
See application file for complete search history.

(56) References Cited

U.S. PATENT DOCUMENTS

| | | | |
|---|---|---|---|
| 1,377,578 A * | 5/1921 | Harris | 374/194 |
| 2,016,527 A | 10/1935 | Voigt | |
| 2,324,204 A | 7/1943 | Fischer | |
| 2,414,915 A * | 1/1947 | Ziegler | 225/33 |
| 2,636,240 A * | 4/1953 | Pokorny | 248/213.2 |
| 2,656,233 A | 10/1953 | Bollmann | |
| 2,683,547 A | 7/1954 | Fischer | |
| 2,973,882 A | 3/1961 | Jeffus | |
| 3,217,955 A | 11/1965 | Tinkey | |
| 3,291,299 A | 12/1966 | Minnotte, Jr. | |
| 3,308,989 A | 3/1967 | Alltop et al. | |
| 3,502,252 A | 3/1970 | Mariani | |
| 3,656,700 A | 4/1972 | Gauvin | |
| 4,008,614 A | 2/1977 | Turner et al. | |
| 4,151,931 A | 5/1979 | Scherer et al. | |
| 4,159,772 A | 7/1979 | Beck | |
| 4,174,048 A | 11/1979 | Volpe, Jr. | |
| 4,218,421 A | 8/1980 | Mack, Jr. et al. | |
| 4,244,220 A * | 1/1981 | Henson et al. | 374/141 |
| 4,328,184 A | 5/1982 | Kondo | |
| 4,372,472 A | 2/1983 | Herrmann | |
| 4,572,365 A | 2/1986 | Bruno et al. | |
| 4,619,271 A | 10/1986 | Burger et al. | |
| 4,717,018 A | 1/1988 | Sacherer et al. | |
| 4,817,820 A | 4/1989 | Heiland | |
| 4,911,344 A | 3/1990 | Kahler | |
| D312,975 S | 12/1990 | Scheurer | |

(Continued)

FOREIGN PATENT DOCUMENTS

DE         4234553         4/1993

(Continued)

*Primary Examiner*—Gail Verbitsky
*Assistant Examiner*—Megann Vaughn
(74) *Attorney, Agent, or Firm*—Quarles & Brady LLP

(57) ABSTRACT

An assembly comprising a thermometer, test strip material and a housing that forms first and second separate compartments for receiving the test strip material and the thermometer, respectively.

46 Claims, 13 Drawing Sheets

U.S. PATENT DOCUMENTS

| | | | |
|---|---|---|---|
| 5,024,349 A | 6/1991 | Haenni et al. | |
| 5,024,622 A * | 6/1991 | Ide | 439/829 |
| 5,617,973 A | 4/1997 | Seto et al. | |
| 5,679,311 A | 10/1997 | Harttig et al. | |
| 5,957,358 A | 9/1999 | Getz et al. | |
| 6,039,177 A * | 3/2000 | Swanson et al. | 206/306 |
| 6,102,098 A | 8/2000 | Randazzo | |
| 6,170,983 B1 * | 1/2001 | Germanow et al. | 374/1 |
| D438,567 S | 3/2001 | Van Den Berg | |
| 6,378,702 B1 | 4/2002 | Kintzig | |
| 6,508,380 B1 | 1/2003 | von Schuckmann | |
| 6,634,789 B2 | 10/2003 | Babkes | |
| 6,681,830 B1 | 1/2004 | Vulpitta et al. | |
| 6,684,924 B1 | 2/2004 | Kelders et al. | |
| 6,827,899 B2 | 12/2004 | Maisey et al. | |
| 6,886,979 B2 * | 5/2005 | Conforti | 374/208 |
| 2002/0057993 A1 | 5/2002 | Maisey et al. | |
| 2002/0076349 A1 | 6/2002 | Aitken et al. | |
| 2002/0104849 A1 | 8/2002 | Giruad | |
| 2003/0071102 A1 | 4/2003 | Haen et al. | |
| 2003/0089730 A1 | 5/2003 | May et al. | |
| 2003/0116583 A1 | 6/2003 | Pugh | |
| 2003/0185705 A1 | 10/2003 | Otake | |
| 2003/0186446 A1 | 10/2003 | Pugh | |
| 2003/0211619 A1 | 11/2003 | Olson et al. | |
| 2003/0223906 A1 | 12/2003 | McAllister et al. | |
| 2004/0007585 A1 | 1/2004 | Griffith et al. | |
| 2004/0146087 A1 * | 7/2004 | Penney et al. | 374/170 |
| 2005/0032234 A1 * | 2/2005 | Ramsey | 436/169 |
| 2005/0244549 A1 * | 11/2005 | Ling | 426/115 |

FOREIGN PATENT DOCUMENTS

| | | |
|---|---|---|
| DE | 4205805 | 9/1993 |
| FR | 73.19376 | 12/1974 |
| GB | 771482 | 4/1957 |
| JP | 2003294723 | 10/2003 |
| WO | WO 90/02167 | 3/1990 |
| WO | WO 9606790 | 3/1996 |

* cited by examiner

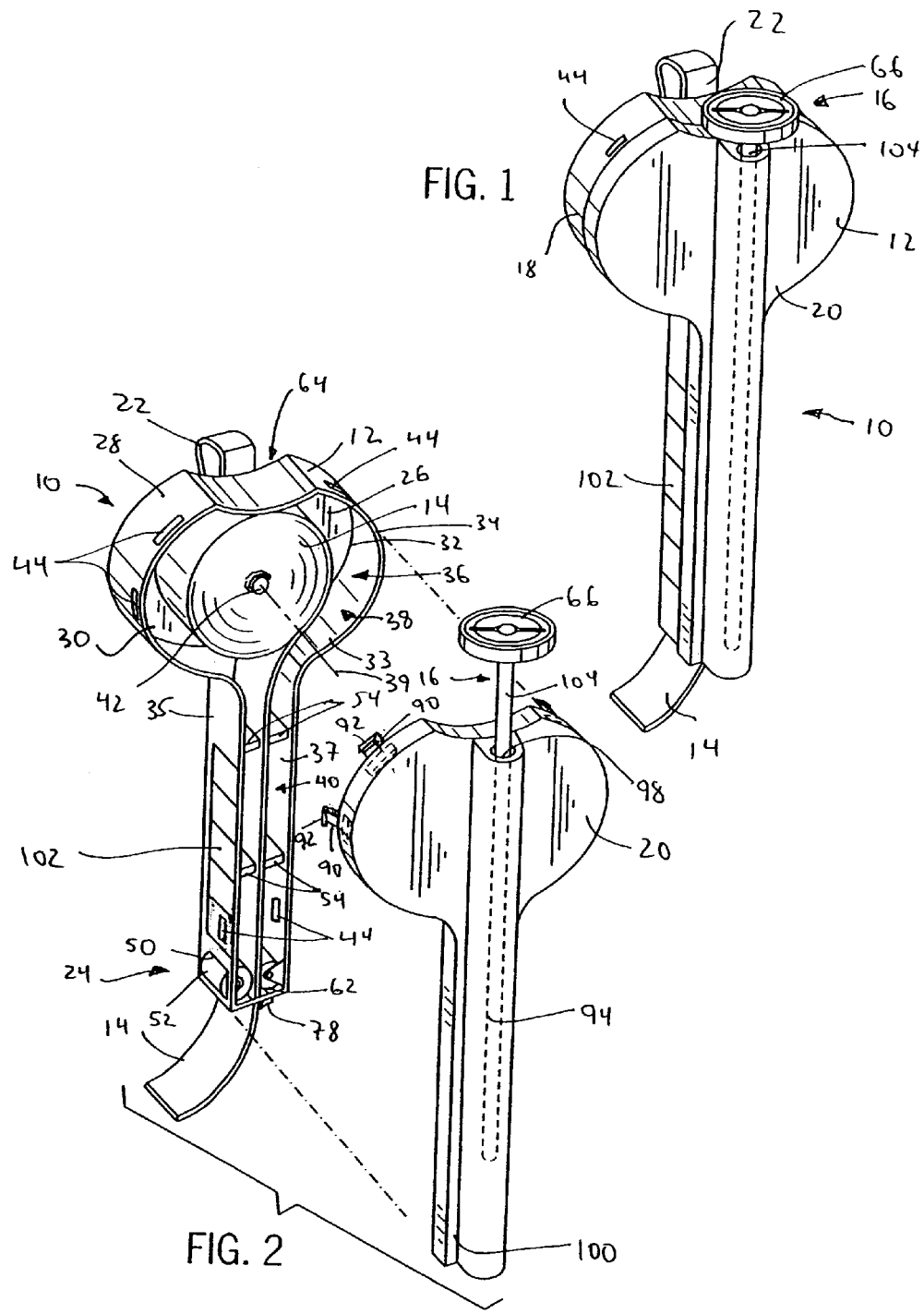

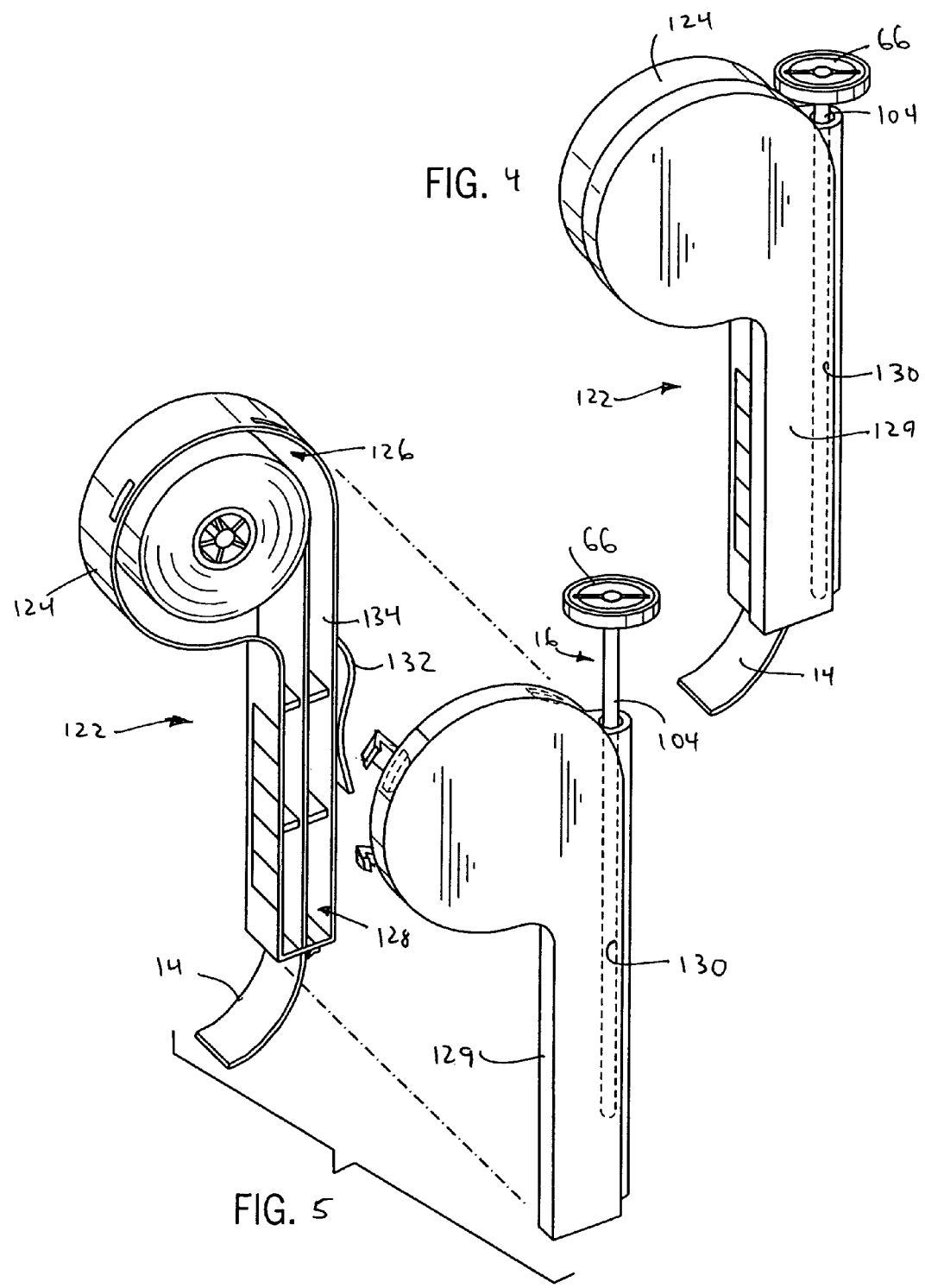

TEST STRIP DISPENSER AND THERMOMETER HOLDER

CROSS-REFERENCE TO RELATED APPLICATIONS

This application is related to U.S. provisional patent application No. 60/661,045 that was filed on Mar. 11, 2005 and that was titled "Test Strip Dispenser and Thermometer Holder".

STATEMENT REGARDING FEDERALLY SPONSORED RESEARCH OR DEVELOPMENT

Not applicable.

BACKGROUND OF THE INVENTION

The present invention relates to dispensers and more specifically to test strip dispensers and thermometers useable in sanitary and typically food preparatory environments.

Hereinafter, in order to simplify this explanation, it will be assumed that a food service worker uses a rag and a liquid sanitizer solution located in a bucket to clean countertops in a restaurant or cafeteria kitchen. In addition, it will be assumed that the service worker uses a thermometer to periodically check sanitizer solution temperature as well as food temperature. Nevertheless, it should be appreciated that the present invention can be, and is intended to be, used in any application where liquid based sanitizer solutions having specific sanitizer potencies and temperatures are required as well as where specific food temperatures are required. For instance, the invention may also be used to check solution characteristics in a restaurant sink filled with a water-sanitizer solution, in a commercial dishwasher that uses a sanitizer solution, etc.

Water is often used for cleaning purposes. As well known disinfecting effectiveness of water can be enhanced by adding certain chemical sanitizers to the water to provide sanitizer solutions and by maintaining the solutions at known effective temperatures (e.g., typically high temperatures). Most sanitizer solutions are effective or are most effective only when the sanitizer solution has at least a minimum level (e.g., 100-200 parts per million) of sanitizer therein and when the solution temperature is within a specific range. In the case of temperature, while heat often increases cleaning effectiveness, in the case of at least some sanitizers, too high a temperature can reduce sanitizer effectiveness and therefore, solution temperature has to be within a range between high and low temperature limits. Recognizing that solution effectiveness changes over time as the solution temperature drops and with use as sanitizer is used or debris is deposited into a solution and recognizing the importance of ensuring clean environments in certain industries (e.g., restaurants where bacteria and germs can cause sickness), municipalities and, in some cases, businesses, have adopted specific codes or rules that require sanitizer solutions to be optimally used. That is, codes/rules often require that sanitizers be used according to instructions provided by the sanitizer manufacturer where the instructions specify sanitizer potency (e.g., amount of sanitizer per gallon of water resulting in a suitable parts per million count) as well as a required temperature range.

Similarly, recognizing that food should be stored at temperatures within certain ranges to ensure freshness and that food should be cooked or prepared at certain temperatures to ensure complete cooking thereby avoiding sickness, municipalities and businesses have adopted codes and rules that specify food temperatures during storage and preparation.

Knowing that sanitizers of specific types, in specific minimum potencies and within certain temperature ranges are required by code/rule, when a kitchen counter top in a restaurant, cafeteria, lab, etc., is to be cleaned, a food service worker charged with maintaining clean countertops will initially draw a quantity of water into a bucket where the water is at a known temperature that is within a suitable temperature range given a cleaning sanitizer type to be used and will dispense an amount of cleaning sanitizer into the water that results in the required sanitizer potency. Potency can initially be ensured through proper measurement of water and sanitizer. A thermometer can be used to ensure proper temperature or, where available, water may be drawn from a temperature controllable faucet. Thereafter, the food service worker dips a rag into the solution in the bucket, rings out the rag and uses the wet hot rag to wipe down and clean/disinfect the counter top.

In many applications the food service worker repeatedly uses the sanitizer solution in the bucket during prolonged cleaning activity (e.g., 1 hour). During prolonged cleaning activity the food service worker repeatedly dips the rag into the solution to remove dirt/debris therefrom, rings out the rag and reuses the rag and solution to wipe down other surfaces. Here, while the solution temperature was initially high (i.e., hot), during the prolonged activity, the solution temperature typically drops thereby reducing cleaning/disinfecting effectiveness.

In addition, in many cases, cleaning/disinfecting sanitizer temperature within a solution changes during use. For instance, in many cases the sanitizer may interact with debris deposited in the bucket thereby rendering the sanitizer less effective for its intended purpose (e.g., cleaning and disinfecting). As another instance, the sanitizer may simply evaporate over time or may be removed from the solution and deposited on the surfaces being cleaned. The end result is that during prolonged use, solution temperature and sanitizer potency often drop to levels below those required by codes/rules. In these cases, codes/rules require the food service worker to either dump the current solution and mix a new solution or to add sanitizer to and/or increase temperature (e.g., add more hot water) of the existing solution.

To facilitate code/rule compliance, tools have been provided to check sanitizer potency in a solution as well as solution and food temperature. For instance, one tool for checking sanitizer potency includes a small paper test strip (e.g., ¼th inch by 1½ inch) that is impregnated with a chemical known to interact with the cleaning sanitizer in a solution and to turn different shades of a certain color as a function of the potency of the cleaning sanitizer in the solution being tested. Here, for instance, when a strip is dipped into a solution, the strip may turn one of first, second, third or fourth different shades of gray when an sanitizer A in the solution is within first, second, third or fourth ranges of potency, respectively. After dipping a strip in the solution, the resulting strip color is compared to a potency scale that includes a color scale correlating different shades of gray to different sanitizer potencies. Here, by associating strip color with a most similar scale color, sanitizer potency is identified. After a test strip has been used, the strip is typically discarded.

To check solution temperature, the food service worker may use a hand held thermometer. Here, the Food service worker holds a distal end of the thermometer in the solution for a short time and then determines solution temperature via reference to the thermometer. Where a test strip or the thermometer indicate that sanitizer potency or solution temperature are below required minimums, the Food service worker knows that some action is required prior to using the solution for additional cleaning purposes to bring the solution back into code.

The same thermometer used to check sanitizer solution potency can be used to check food temperature. In this regard, sanitizer solution having a potency required by code/rule, even after being used to sanitize a countertop or other food preparation surface, operates to sanitize the thermometer which renders the thermometer safe for food temperature testing.

In the case of the test strips, test strips can come in many different forms. For instance, test strips can be provided as separate strip material. As another instance, a roll of test material may be provided where a tester is required to tear off a piece of the roll to provide a separate test strip. As still one other instance, a ribbon of test material may be provided where perforations are formed at equispaced locations along the length of the ribbon to distinguish one test strip from the next and to aid in separating one test strip from the ribbon. Here, the ribbon may be provided in a roll form or, in the alternative, may be folded along the perforations in an accordion type fashion during storage.

Because compliance with codes requires a food service worker to routinely use strips and thermometers, the food service worker should carry the thermometer and strips along during cleaning activity (i.e., it is impractical to expect a food service worker to travel to some remote testing location each time the food service worker attempts to test potency and temperature). Here, in at least some cases a small container (e.g., a box or canister) that fits in a food service worker's pocket and that includes a cover may be provided that forms an enclosed space for receiving the test material or strips. When a strip is required, the container top is removed and a strip is obtained from within the space. Here, the container provides a storage space and protects the strips or strip material inside the space from water and from being crushed.

To carry a thermometer, sheaths have been provided that form a passageway for receiving a thermometer shaft. Here, in some cases, a clip is provided on the external surface of the sheath for clipping the sheath to a belt, a shirt or pant pocket, etc.

The test strips and thermometers described above operate well to check sanitizer potency and solution temperature. Unfortunately, known ways of facilitating transport/providing both strips and thermometers have several shortcomings that make it inconvenient to test solution potency and temperature as well as to test food temperatures. Where testing is inconvenient, compliance is less likely. First, food service workers are already typically overburdened with tools that are required to perform other tasks and often carry those tools in pant and shirt pockets. Where strips and a thermometer are separate and located in a food service worker's pocket, requiring the food service worker to fumble through his pocket separately for each of the strip container and the thermometer is inconvenient. In many cases, a food service worker may have wet hands, hands with small pieces of food thereon or even hands with bacteria/germs thereon such that placement of his hands in a pocket to locate strips or the thermometer is not only uncomfortable but is also unsanitary. By requiring a food service worker to carry two additional tools, a strip container and a separate thermometer, current ways to facilitate sanitizer potency and temperature testing are clearly burdensome.

Second, requiring a food service worker to remove and replace a cover on a strip container each time sanitizer potency is to be tested is often messy and can result in contamination of other strips or material in the container that are to be used subsequently. In this regard, often a food service worker engaged in a cleaning process will have water or some other liquid chemical on his hands when attempting to retrieve a strip from the container. Here, where the food service worker has to insert one or more fingers in the container to retrieve a strip, liquid or moisture from the food service worker's fingers may contaminate the other strips and render the other strip useless for future testing.

Therefore, it would be advantageous to have an apparatus wherein both a thermometer and strips could be stored and protected at the same time. In addition, it would be advantageous to have an apparatus that couples a strip container to a thermometer so that when the apparatus is accessed, both the thermometer and the strips are accessible for sequential use. Moreover, it would be advantageous if an apparatus having the above characteristics were shaped to facilitate comfortable placement within a shirt or pant pocket or, in at least some cases, to be clipped onto a belt or the like.

BRIEF SUMMARY OF THE INVENTION

At least some inventive embodiments include an assembly comprising a thermometer, test strip material and a housing that forms first and second separate compartments for receiving the test strip material and the thermometer, respectively. In at least some cases the housing forms a slot that opens out of the first compartment through which one end of the test strip material is fed. At least some embodiments are for use with test strip material including at least one end wherein the first compartment includes compartment wall surfaces that guide the at least one end of the strip material toward the slot when the material is within the first compartment.

In some cases the assembly is for use with test strip material in the form of a roll and at least a portion of the first compartment is cylindrical. In some cases a second part of the first compartment is elongated and extends from the first part of the first compartment and wherein the slot is provided at a distal end of the second part of the first compartment. In some cases the second part of the first compartment extends along a trajectory that is aligned with the center of the cylindrical first part.

In some embodiments the thermometer includes an elongated shaft and a head at a proximal end of the shaft and wherein the second compartment includes an elongated passageway open at least one end for receiving the thermometer. Some embodiments include a blade proximate the slot for cutting the strip material into sheets. In some cases a color scale is located on an external surface of the housing. In some cases a clip extends from an external surface of the housing.

In some cases the housing includes a first housing member and a second housing member that form first and second cavities, at least one of the cavities at least in part forming the second compartment. In some cases the first and second cavities together form the second compartment. In some cases the second housing member is mounted to the first housing member for pivotal movement between an open position and a closed position.

In some embodiments the housing further includes an internal housing subassembly that includes at least a first internal housing member mounted at least in part within the second compartment to at least in part separate the first compartment from the second compartment.

In some cases the internal housing subassembly further includes a second internal housing member mounted at least in part within the second compartment that cooperates with the first internal housing member to separate the first compartment from the second compartment. In some cases the first and second internal housing members are secured within the first cavity via a friction fit. In some cases at least a portion of at least one of the internal housing members is transparent, the assembly further including a scale member receivable within the first compartment and that is viewable through the transparent portion of the internal housing member.

In some embodiments the first housing member forms an opening into the first cavity and wherein at least a portion of the transparent portion of the internal housing member is received within the opening. In some cases at least a portion of the housing is transparent, the assembly further including a scale member receivable adjacent the transparent portion of the housing so that at least a portion of the scale member is viewable through the transparent portion.

In some cases the scale member is received in the first compartment along with the strip material. In some cases the strip material includes a roll of strip material. In some embodiments the first and second housing members include complimentary peripheral edges along the cavities that align when the second housing member is closed to the first housing member, at least one of the housing members forming a notch in the peripheral edge with a loose end of the roll of strip material extending through the notch. In some cases at least one of the housing members forms a serrated edge adjacent the notch.

Other embodiments include an assembly comprising a thermometer, test strip material, an internal housing that forms a first compartment for receiving the test strip material and an external housing that forms a second compartment for receiving the internal housing and at least a portion of the thermometer. In some cases each of the internal and external housings form openings through which a loose end of the test strip material extends. In some cases the external housing includes first and second external housing members that form first and second cavities, respectively, where the first and second cavities together form the second compartment, the internal housing mounted at least in part within the first cavity and at least partially exposed when the second external housing member is in the open position.

In some cases the internal housing is substantially open to one side and wherein the open side is exposed when the second external housing member is in the open position. In some cases the test strip material forms a roll of strip material. In some cases the assembly further includes a retaining member supported by one of the housing members and that extends at least part way into the second compartment for impeding removal of the thermometer when the thermometer is received within the second compartment. The assembly of claim 35 wherein the portion of the thermometer received in the second compartment includes a thermometer shaft.

The assembly of claim 28 wherein at least a portion of at least one of the internal housing is transparent, the assembly further including a scale member received in the first compartment and at least partially viewable through the transparent portion.

The assembly of claim 37 wherein the external housing forms an opening, at least a portion of the transparent portion of the internal housing aligned with the opening so that the scale member is viewable through the opening.

The assembly of claim 28 wherein external housing includes first and second external housing members that form first and second cavities, respectively, where the first and second cavities together form the second compartment, the first and second external housing members including complimentary peripheral edges along the cavities that align when the second external housing member is closed to the first external housing member, at least one of the external housing members forming a notch in the peripheral edge with a loose end of the roll of strip material extending through the notch.

In some cases the thermometer includes a keyed calibration member and the external housing forms a keyed calibration recess for receiving the keyed calibration member. In some cases the keyed calibration member and recess are hexagonal in shape. In some cases the external housing forms at least first and second keyed calibration recesses of different dimensions for receiving at least two differently sized keyed calibration members.

Still other embodiments include an apparatus for storing a roll of test strip material and an elongated thermometer, the apparatus comprising a housing forming a cavity and a passageway that is separate from the cavity, the cavity including a cylindrical portion, the passageway extending along side and away from the cylindrical portion, the cavity for receiving the roll and the passageway for receiving the thermometer.

Other embodiments include an apparatus for storing test strip material and an elongated rigid thermometer, the apparatus comprising a housing forming a cavity and a passageway that is separate from the cavity, the cavity having a long dimension along a first edge, the passageway aligned along the first edge and generally parallel to the long dimension of the cavity, the cavity for receiving the test strip material and the passageway for receiving the thermometer.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 1 is a perspective view of a first inventive dispenser embodiment;

FIG. 2 is a partially exploded perspective view of the dispenser of FIG. 1;

FIG. 4 is a perspective view of a second inventive dispensing embodiment;

FIG. 5 is a partially exploded perspective view of the second inventive dispenser of FIG. 4;

DETAILED DESCRIPTION OF THE INVENTION

Figure 3:
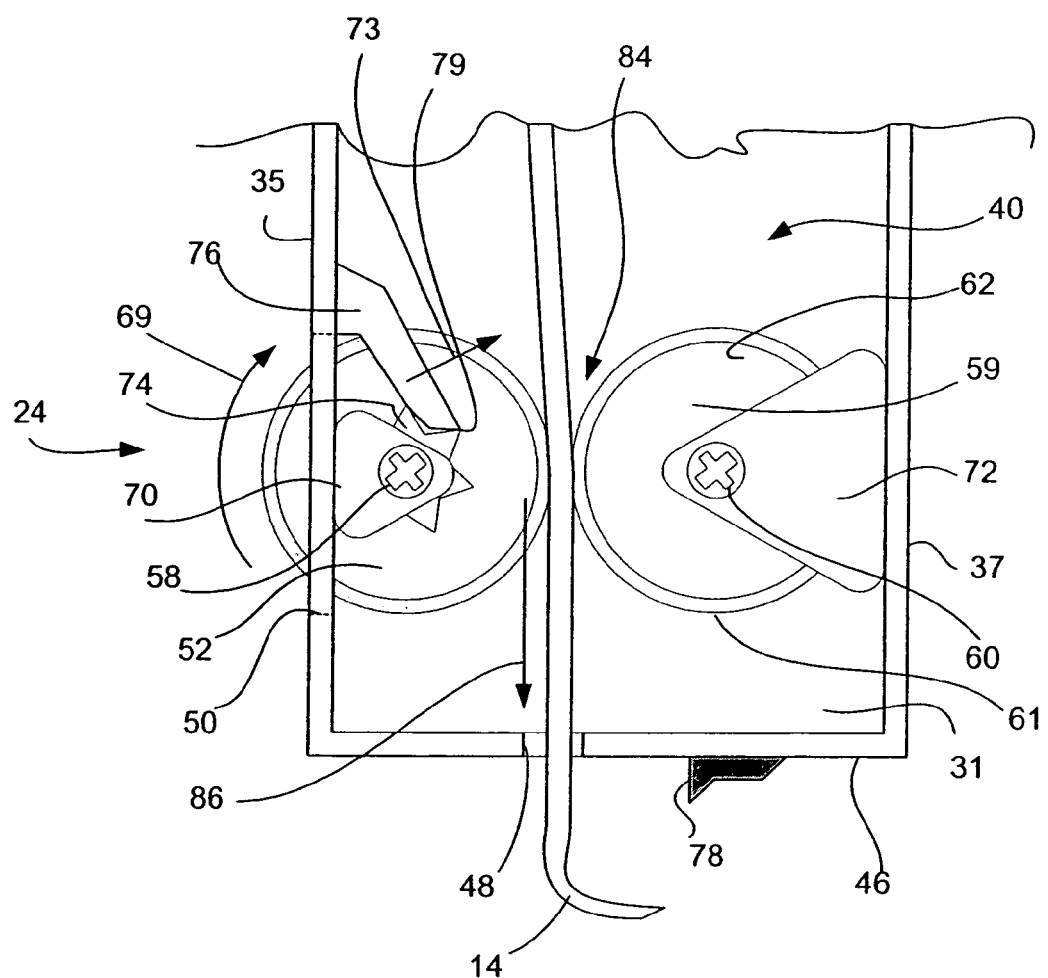
FIG. 3 is a side plan view of an end portion of the dispenser of FIG. 2.

One or more specific embodiments of the present invention will be described below. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Referring now to the drawings wherein like reference numerals correspond to similar elements throughout the several view and, more specifically, referring to FIGS. 1, 2 and 3, a first embodiment the present invention will be described in the context of an exemplary dispenser assembly 10 that includes, in at least some embodiments, a housing sub-assembly 12, a roll of test material 14 and a thermometer 16. Housing sub-assembly 12, in at least some embodiments, includes a container member 18, a cover member 20, a clip 22 and an indexing sub-assembly 24. Container member 18 is formed of a rigid material (e.g., plastic) and includes a base wall member 26 and a peripheral wall member 28. Base wall member 26 is a substantially flat rigid wall structure that includes a generally cylindrical portion 30 and an elongated portion 31 (see end of 31 in FIG. 3) that extends from the cylindrical portion 30 along an axis that generally passes through a central part of cylindrical portion 30. Base wall member 26 forms a lateral edge 32.

Referring still to FIGS. 1 and 2, peripheral wall member 28 includes several different wall sections that are integrally formed together and that extend perpendicular to and along the entire lateral edge 32 of base wall member 26. The lateral wall sections include a generally cylindrical wall section 33 that extends from lateral edge 32 adjacent circular member 30, first and second elongated lateral wall members 35 and 37 that extend from cylindrical wall member 33 along the elongated portion of base wall member 26 and a distal end wall member 46 at the end of the elongated base wall member portion 31. Together, lateral wall members 33, 35, 37 and 46 extend to distal edge 34 that resides within a single plane. The base wall member 26 and peripheral wall member 28 together define a test material receiving cavity 36 including a generally cylindrical portion 38 formed about a central axis 39 and an elongated portion 40 that extends away from cylindrical portion 38 along a second axis (not labeled) that is perpendicular to central axis 39.

Referring yet again to FIGS. 1, 2 and 3, peripheral wall member 28 forms a plurality of openings that facilitate different functions. To this end, a plurality of slot-type openings 44 are formed by peripheral wall member 28 adjacent distal edge 34 that cooperate with other mechanical structure formed by cover member 20 to secure cover member 22 to container member 18 in a manner to be described in greater detail below. In addition, referring to FIG. 3, a dispensing slot 48 is formed in end wall 46 where slot 48 has a length dimension (not labeled) that is parallel to central axis 39 (see FIG. 2). Moreover, an indexing opening 50 is formed in lateral wall 35 adjacent end wall 46 through which a portion of an indexing roller 52 that forms part of the indexing sub-assembly 24 extends.

Referring once again to FIG. 2, in the illustrated embodiment, container member 18 also forms other structure within cavity 36 for supporting and guiding test material roll 14 and for supporting the indexing sub-assembly components. To this end, a post 42 is integrally formed with base wall member 26 and extends perpendicular thereto along central axis 39 in the same direction that peripheral wall member 28 extends from base wall member 26. Post 42 is provided as a support for roll 14 as illustrated. In some embodiments post 42 may not be provided and roll 14 may simply reside in cavity 36 being supported by the internal surface of wall member 33. In addition, pairs of strip stabilizers, collectively identified by numeral 54, are provided along the length of cavity portion 40 where proximate ends of stabilizers 54 in each pair form slots for passing and guiding test material as the material is unwound from roll 14 and moves along the elongated cavity portion 40 toward slot opening 48 during indexing activity. The slots formed by strip stabilizing pairs 54, like slot opening 48, have length dimensions that are parallel to central axis 39.

Referring yet again to FIG. 2, in at least some embodiments cylindrical wall portion 33 forms a depression 64 opposite the elongated cavity portion 40 for receiving a head portion 66 of thermometer 16.

Referring now to FIG. 3, indexing assembly 24 includes rollers 52 and 62, support structure including brackets 70 and 72 and a limiting finger 76. Each of rollers 52 and 62 includes a cylindrical roller member that forms a central opening (not labeled) so that the roller 52 and 62 can be mounted on dowels 58 and 60 for rotation therearound. In at least some embodiments, each roller 52 and 62 will include a rigid plastic central member 59 and an rubber sheath 61 around the external cylindrical surface of the plastic member where the sheath has a tackiness that substantially reduces slippage of a test material ribbon therealong. In addition to including the cylindrical member 59 and, perhaps, a rubber sheath therearound, roller 52 also includes a ratchet wheel 74 at one end where the ratchet wheel forms a plurality of teeth that are equispaced about the central opening of the roller. The teeth formed by ratchet wheel 74 cooperate with limiting finger 76 to essentially limit rotation of roller 52 in one direction indicated by arrow 69 in a manner to be described in greater detail below.

Referring to FIGS. 2 and 3, although one end bracket 70 is illustrated, it is contemplated that, in at least some embodiments, a pair of end brackets 70 would be provided, one end bracket 70 extending from an internal surface of lateral wall member 35 on each side of opening 50 so that end brackets 70 are parallel to each other. Dowel 58 extends between distal ends of the end brackets 70 and roller 52 is mounted thereon. As illustrated, brackets 70 are sized such that, when roller 52 is mounted to dowel 58 extending therebetween, a portion of roller 52 extends from opening 50.

Limiting finger 76 is a semi-rigid member and is mounted to the internal surface of wall member 35 adjacent ratchet wheel 74 and such that a distal end 79 is pressed against one of the teeth formed by ratchet wheel 74. Member 76 is configured to be able to resiliently bend in the direction indicated by arrow 73 so that, as roller 52 is rotated in the direction indicated by arrow 69, the distal end 79 of finger 76 is forced out of the way of the ratchet wheel teeth allowing roller 52 to be rotated. However, if force is applied to roller 52 in the direction opposite arrow 69, finger 76 becomes caught on one of the ratchet wheel teeth and prohibits rotation. Thus, roller 52 can only be rotated in the direction indicated by arrow 69.

Referring yet again to FIGS. 2 and 3, although only one end bracket 72 is illustrated, it is contemplated that a pair of end brackets 72 may be provided that extend from the internal surface of lateral wall member 37 toward opening 50 formed by opposite lateral wall member 35. Here, second roller 62 is mounted via dowel 60 that extends between distal ends of the end bracket pair 72. When rollers 52 and 62 are mounted as described above, facing surfaces of rollers 52 and 62 form an opening 84 that is sized to tightly pass a ribbon 14 of the test material. Here, where rubber sheaths 61 are provided on the external surfaces of roller 52 and 62, the resiliency of the sheaths can be used to sandwich the test material 14 therebetween. The opening 84 formed between facing surfaces of rollers 52 and 62 is generally aligned with slot opening 48 formed in end wall 46. In at least some cases, a blade member 78 is provided adjacent slot opening 48 to help an assembly user tear a section of test material off the longer ribbon portion 14. While blade member 78, brackets 70 and 72 and finger 76 are shown as separate components that are mechanically mounted to container member 18, it should be appreciated that in at leas some embodiments each of components 78, 70, 72 and 76 could be integrally formed into member 18.

Referring still to FIGS. 2 and 3, it should be appreciated that when a ribbon section of test material 14 is disposed between rollers 52 and 62, when roller 52 is rotated in the direction indicated by arrow 69, the adjacent and facing surfaces of roller 52 and 62 together force the ribbon 40 in the direction indicated by arrow 86 and toward slot opening 48. Roller 52 can be continually rolled until a sufficiently long section of the ribbon 14 extends from opening 48 after which the extending portion of the ribbon 14 can be torn off using blade member 78. Here, because limiting finger 76 and ratchet wheel 74 cooperate to disallow rotation of roller 52 in the direction opposite the direction of arrow 69, finger 76 and wheel 74 in conjunction with rollers 52 and 62 should hold the distal end of ribbon 14 and disallow the distal end from inadvertently moving back into the cavity 36 where the distal end is inaccessible. In addition, blade 78 is spaced apart from opening 48 so that after a piece of the test material has been torn off from the ribbon, a small section of the ribbon still extends from opening 48 that can be grasped if necessary to advance the ribbon 14.

Referring once again to FIGS. 1 and 2, cover member 20 is a rigid generally flat member that has a shape that mirrors the shape defined by distal edge 34 such that, when member 20 is placed against edge 34, member 20 completely enclosed cavity 36. Cover member 20 forms a depressed edge section 95 that mirrors the depressed portion 64 formed by wall member 28. To hold member 20 in its closed position, arm members 90 are provided that align with slots 44 when member 20 covers the opening of cavity 36. At the distal ends of arm members 90, fingers member 92 extend laterally so that the finger members are receivable within slots 44. Although not illustrated, a channel may be provided along the edge of member 20 that receives distal edge 34 to help align cover member 20 with edge 34. Once cover member 20 has been secured to container member 18, to remove cover member 20, the user simply pushes finger members 92 inward through slots 44 and pulls cover member 20 from distal edge 34.

Referring still to FIGS. 1 and 2, member 20 forms a compartment or passageway 94 on a surface 96 opposite the surface from which arm members 90 extend where the passageway 94 is open at at least one end 98. In the illustrated embodiment, the open end 98 is adjacent the depressed edge section 95 of member 20. The passageway 94 generally extends along an elongated portion 100 of cover member 20.

Referring still to FIGS. 1 and 2, belt clip 22 is mechanically secured to an external surface of circular base wall portion 30. In addition, a printed color scale 102 is mounted or otherwise secured to an external surface of lateral wall member 35. Here, scale 102 may be in the form of a sticker and hence may be adhered to the external surface of member 35. In other cases, scale 102 may take the form of an insert to be inserted below a clear plastic window or the like formed by member 18. In other case, container member 18 and/or cover member 20 may be formed of clear plastic material and an insert type scale 102 may be provided thereunder where colors on the scale are visible through the clear plastic material.

Referring still to FIGS. 1 and 2, exemplary thermometer 16 includes a shaft 104 and a head 66 at one end of the shaft 104. Thermometer shaft 104 is dimensioned such that it is snugly receivable within passageway 94. Head 66 is dimensioned such that at least a portion thereof is receivable within the space formed by depressed edge 95 and portion 64 in members 20 and 28, respectively (see FIG. 1).

In operation, an assembly user may clip assembly 10 on to a belt or a shirt pocket using clip 22 with end wall 46 typically facing downwardly. When the user wants to determine sanitizer potency within a liquid mixture, the user simply rotates wheel 52 in the direction indicated by arrow 69 in FIG. 3 to dispense a length of test material 14. Once a sufficient length of test material has been dispensed, the user tears off the portion with the aid of blade 78. After dipping the torn off section of test material into the liquid to be tested, the user holds the test material section adjacent scale 102 and determines sanitizer potency. Thereafter, the used test material section is discarded. When the user wants to check the temperature of a cleaning liquid, the user simply pulls up on thermometer head 66 to remove thermometer 16 from passageway 94, uses the thermometer to test the temperature and then, after drying off the thermometer shaft 104, replaces the thermometer in passageway 94.

Referring now to FIGS. 4 and 5, a second inventive embodiment is illustrated. In the case of the second illustrated embodiment, many of the embodiment features and the way those features operate should be obvious in light of the description above with respect to FIGS. 1 through 3 and therefore, in the interest of simplifying this explanation, those features will not again be described here in detail. Instead, only distinctions between the first and second embodiments will be described here. The most basic difference between assembly 10 described above and assembly 120 illustrated in FIGS. 4 and 5, is that the general shape of the housing sub-assembly in FIGS. 4 and 5 is different than the embodiment in FIGS. 1 through 3. To this end, when viewed from a front plan perspective, the housing sub-assembly 122 in FIGS. 4 and 5 has a "P" shape to it where a container member 124 forms a cylindrical cavity portion 126 and an elongated cavity portion 128 that extends along a trajectory that is aligned tangentially along an edge of the cylindrical portion 126. In addition, a cover member 129 included as part of assembly 120 forms a thermometer receiving passageway 130 along a cover edge as opposed to along the surface of member 129 opposite the surface that faces cavity 126 when cover member 130 is in its closed position. Nevertheless, in this embodiment, passageway 130 still extends along the elongated portion of the housing assembly 122. Moreover, in this embodiment, the indexing sub-assembly 24 illustrated in FIGS. 1 through 3 is not included and instead, to remove test material, a user has to pull down on the distal end of the test material ribbon 14. Furthermore, a clip 132 is mechanically attached to an external surface of one of the lateral elongated wall members 134. Here, as best illustrated in FIG. 4, it should be appreciated that when the thermometer 16 is received within channel 130, thermometer head 66 can be accommodated just above the rounded portion of the container member 124 and cover member 129 (see FIG. 4).

Figure 6:
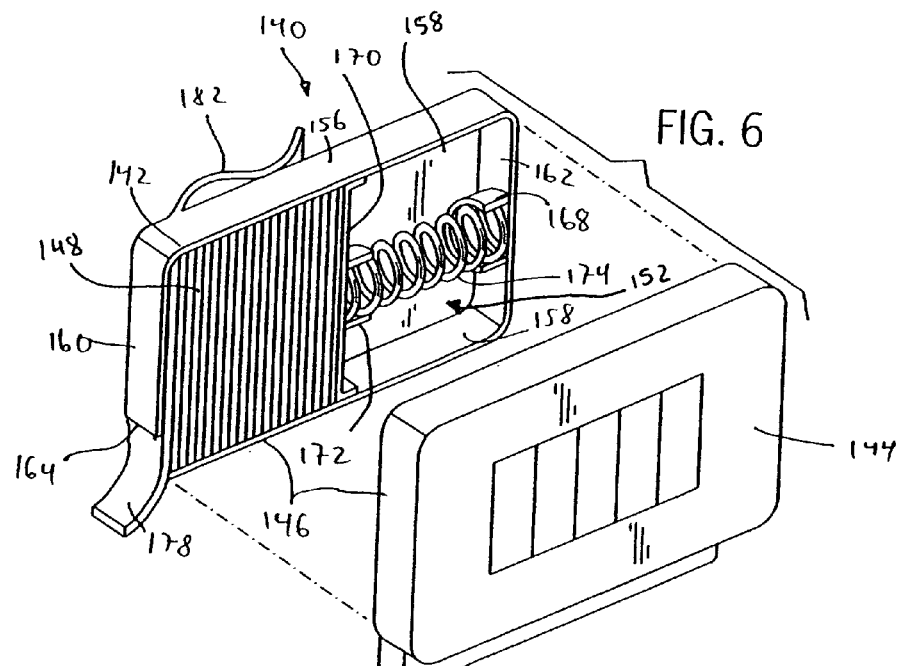
FIG. 6 is a partially exploded perspective view of a third inventive dispensing embodiment.

Referring now to FIG. 6, a third inventive assembly 140 is illustrated that includes a housing sub-assembly 146, a stack of test material strips 148, a thermometer 150, a spring 174 and a plunger member 170. Housing sub-assembly 146 includes a container member 142 and a cover member 144. In this embodiment, container member 142 generally includes wall structure that forms a rectilinear cavity 152. To this end, member 142 includes a rectilinear base wall 154, first and second lateral walls 156 and 158 and first and second end walls 160 and 162, respectively. Lateral walls 156 and 158 extend perpendicularly from base wall 154 and from opposite edges thereof. Similarly, end walls 160 and 162 extend perpendicularly from base wall 154 and from opposite edges thereof and generally traverse the distance between adjacent ends of lateral walls 156 and 158 thereby forming the rectilinear cavity 152. Adjacent one end of lateral wall 158, end wall 160 forms an opening 164.

A C-shaped member 168 extends from a central portion of the internal surface of end wall 162 toward opposite end wall 160. Plunger member 170 which is generally a rigid flat member has a length dimension (not labeled) similar to the distance between lateral walls 156 and 158. A second C-shaped member 172 extends from a central portion of a flat surface of plunger member 170. Plunger member 170 is positionable within cavity 152 such that C-shaped member 172 faces C-shaped member 168. When plunger member 170 is so positioned, compression spring 174 can be placed between facing surfaces of end wall member 162 and plunger member 170 with the distal ends of spring 174 received within C-shaped members 172 and 168 such that spring 174 applies a force to plunger member 170 generally causing plunger member 170 to be driven toward end wall 160.

As illustrated in FIG. 6, stack 148 of test material strips can be placed between plunger member 170 and a facing surface of end wall 160 such that spring 174 and plunger 170 drive stack 148 toward wall 160. When stack 148 is so positioned, one end of the test strip 178 adjacent wall 160 is accessible through opening 164. Here, to remove a test strip, a user can simply place his finger on the exposed end of the test strip and slide the test strip 178 out of the opening 164 along a direction parallel to wall 160.

Referring still to FIG. 6, cover member 144 is generally a flat rigid member and is sized and shaped for closing the opening of cavity 152. Although not illustrated, arm members and slots akin to members 90 and slots 44 illustrated in FIG. 2 may be provided for securing cover member 144 to container member 142. Here, as in the other embodiments, cover member 144 forms a thermometer receiving passageway 180 along a long dimension thereof for receiving the shaft 104 of thermometer 16. Once again, in the case of assembly 140, a clip 182 for mounting assembly 140 to a belt, a shirt pocket or the like is provided. A printed scale 184 is attached to an external surface of cover member 144 or, in the alternative, may be inserted within a clear plastic window formed by cover member 144.

Figure 7:
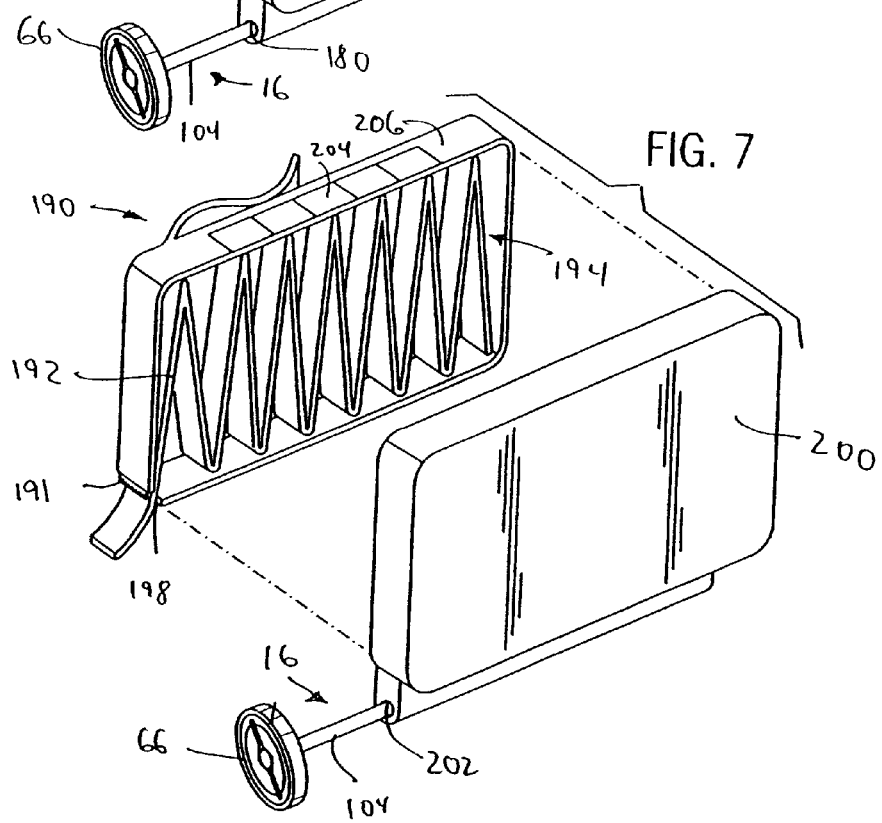
FIG. 7 is similar to FIG. 6, albeit illustrating a fourth inventive dispensing embodiment.

Referring now to FIG. 7, a fourth inventive assembly 190 is illustrated that is similar to the assembly 140 in FIG. 6. In FIG. 7, instead of providing a test strip stack 148, an accordion folded test strip ribbon 192 is provided which is received in a rectilinear cavity 194 formed by a member 196. Here, instead of providing a biasing spring or the like to move test strip material toward a dispensing slot 198, end attachment of the material strips is relied upon. Thus, when an end of the ribbon 192 is pulled through slot 198, an adjacent portion of the ribbon is advanced and moves along toward slot 198 so that when a first section of the test material is removed, the next section of the test material will be accessible adjacent slot 198. In this case, a blade member 191 is provided adjacent slot 98 to aid in strip section separation. Here, cover 200 is similar to cover 144 described above with respect to FIG. 6 and therefore is not described here again in detail. Here, it should suffice to say that cover 200 still forms a thermometer receiving passageway 202 along its long dimension. In the embodiment of FIG. 7, a printed scale 204 is provided on the external surface or in a location that is visible through an external surface of a lateral wall 206 of container member 196.

Figure 8:
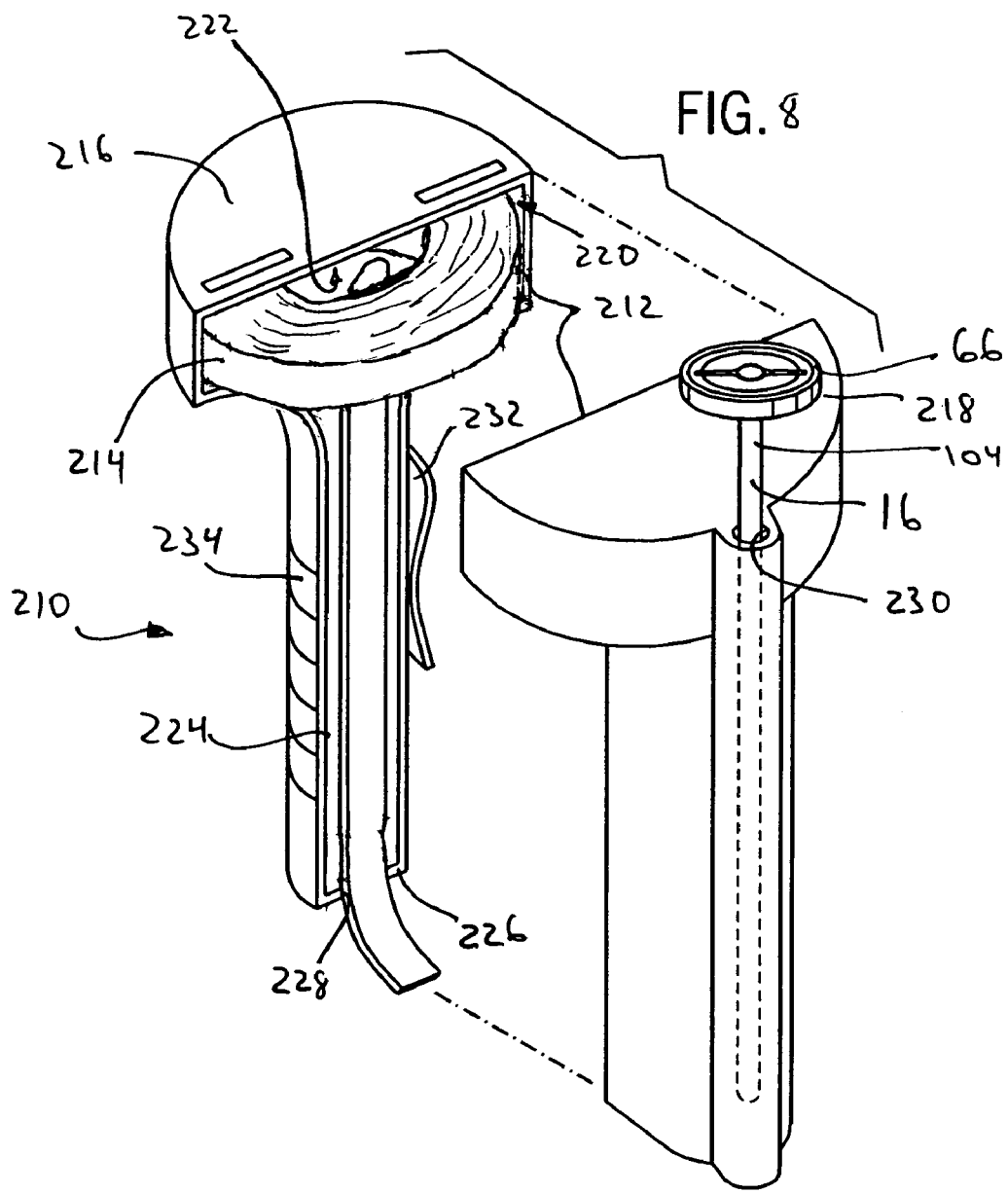
FIG. 8 is similar to FIG. 6, albeit illustrating a fifth inventive dispensing embodiment.

Referring now to FIG. 8, a fifth inventive assembly 210 is illustrated that includes a housing sub-assembly 212, a center pull roll of test material 214 and a thermometer 16. In this embodiment, housing sub-assembly 212 includes first and second clam shell type container members 216 and 218. The cavities formed by each of members 216 and 218 is similar in shape and construction and therefore, in the interest of simplifying this explanation, only the cavity formed by member 216 will be described here in detail. In this regard, member 216 forms an internal cavity 220 that includes a half-disc shaped section 222 and an elongated section 224 that extends generally and from a central portion of the half-disc shaped section 222. When members 216 and 218 are secured together, the half-disc shaped portion 222 and a similar portion formed by member 218 form a whole-disc shaped portion and portion 224 and a similarly shaped portion formed by member 218 form an elongated channel that opens at a distal end 226 through a slot 228. In this embodiment, the center pull roll 214, as the label implies, includes a roll of test strip material that is receivable within the disc-shaped portion of channel 220 such that an end of the roll material near the center of the roll is generally aligned with the channel that extends to slot 228. Thus, as illustrated, the distal end of the roll material can be pulled down through the elongated portion of housing sub-assembly 212 and through slot 228. Here, as in the other embodiments, one of the housing members, in this case, member 218, forms a thermometer receiving passageway 230 that generally extends along the length of the elongated portion of the housing sub-assembly. In addition, a clip 232 is mechanically attached to the housing sub-assembly and a printed scale 234 is provided at a location where the scale can easily be viewed.

Figure 9:
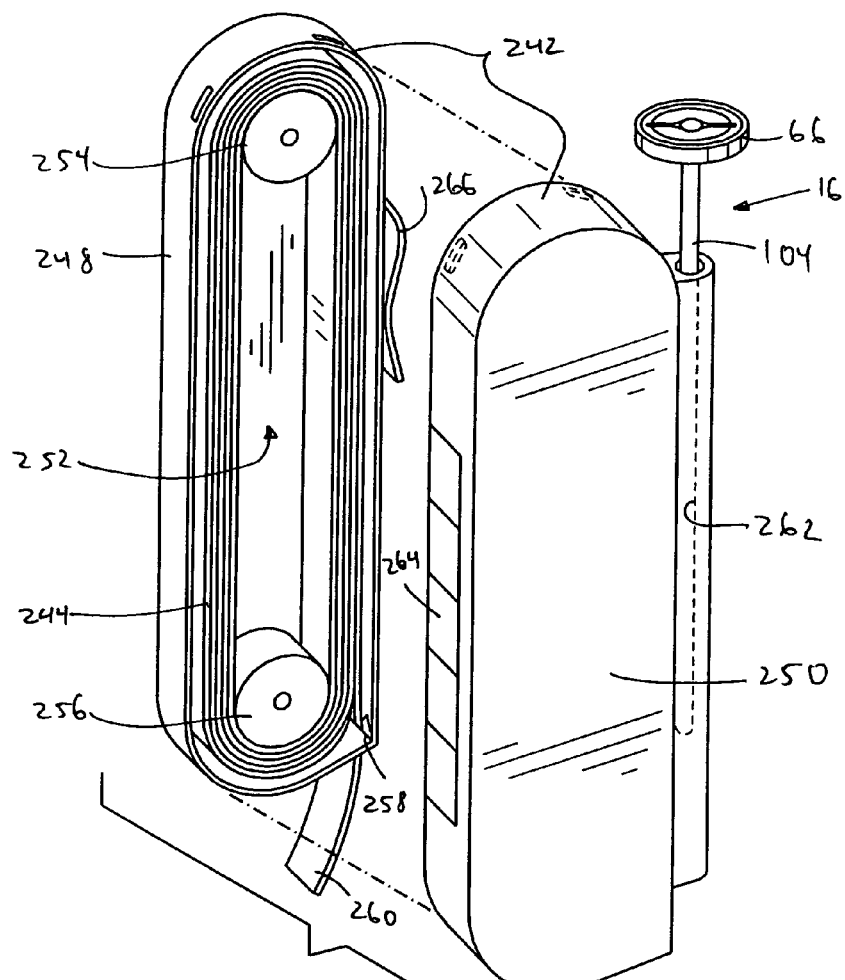
FIG. 9 is similar to FIG. 6, albeit illustrating a sixth inventive dispensing embodiment.

Referring now to FIG. 9, a sixth inventive assembly 240 is illustrated that includes a housing sub-assembly 242, an elongated roll of test material 244 and a thermometer 246. Housing sub-assembly 242 includes a container member 248 and a cover member 250. Here, container member 248 forms a generally elongated and somewhat oval shaped internal cavity 252 where first and second rollers 254 and 256 are mounted generally near opposite ends for supporting the elongated roll of material 244 thereon. Proximate one end of the cavity 252, member 248 forms an outlet slot 258 for passing an end 260 of the material 244 therethrough. Although not illustrated, a blade or serrated edge may be provided adjacent slot 258 for tearing portions of the material from roll 244. Cover member 250 is sized and shaped to be receivable adjacent container member 248 to close the open end of cavity 252. Once again, although not illustrated, mechanical structure such as arm members may be provided to interact with slots formed by container member 248 to secure cover member 250 to container member 248. Here, as in the other embodiments, a thermometer receiving passageway 262 is formed along a long edge of cover member 250. In addition, a printed scale 264 is provided along one edge of cover member 250 and a clip 266 is mechanically attached to container member 248.

Referring now to FIGS. 13 through 18, a seventh embodiment 300 is illustrated that includes a housing subassembly 302, a clip member 350, a test material roll 314 and a thermometer 308. Housing subassembly 302 includes, among other components, an external housing subassembly 450 and an internal housing subassembly 330. External housing subassembly 450 includes a first housing member or container 304, a second housing member or cover 306 and a roller wheel member 312. First housing member 304 is a general elongated member extending between first and second ends 316 and 318 and forms a first channel or cavity 342 that opens to one side and that includes oppositely facing front and rear wall members 315 and 317, respectively, that are separated by channel or cavity 342. Channel 342 has a deep portion and a relatively shallow portion proximate first and second ends 316 and 318, respectively. Front wall member 315 forms an enlarged opening 344 that opens into channel 342. A pivot dowel 319 is located between wall members 315 and 317 at first end 316. Member 304 forms other internal structure (not labeled) for guiding other components and for friction fitting or snapping to other components. For instance, a rear surface (not labeled—see FIG. 14) of rear wall member 317 forms mechanical features for receiving clip member 350 in a snap fit manner. Similarly, facing portions of wall members 315 and 317 proximate the peripheral edge of channel 342 at second end 318 form openings 321 and 323 (see FIG. 15) for receiving tabs 325 and 327 to secure member 306 to member 304. As another instance, structure within channel 342 is provided to guide a shaft 356 of thermometer 308 when inserted. At second end 318 member 304 also includes a top wall member 289 that forms an opening 291 that opens into channel 342 where the opening 291 is aligned along a trajectory generally parallel to channel 342. Structure internal to cavity 342 also serves to guide the thermometer shaft 356. At second end 318, member 304 forms a through hole 470 for securing the assembly 300 to a key chain, a necklace, or some other device akin to a strand or string.

Figure 14:
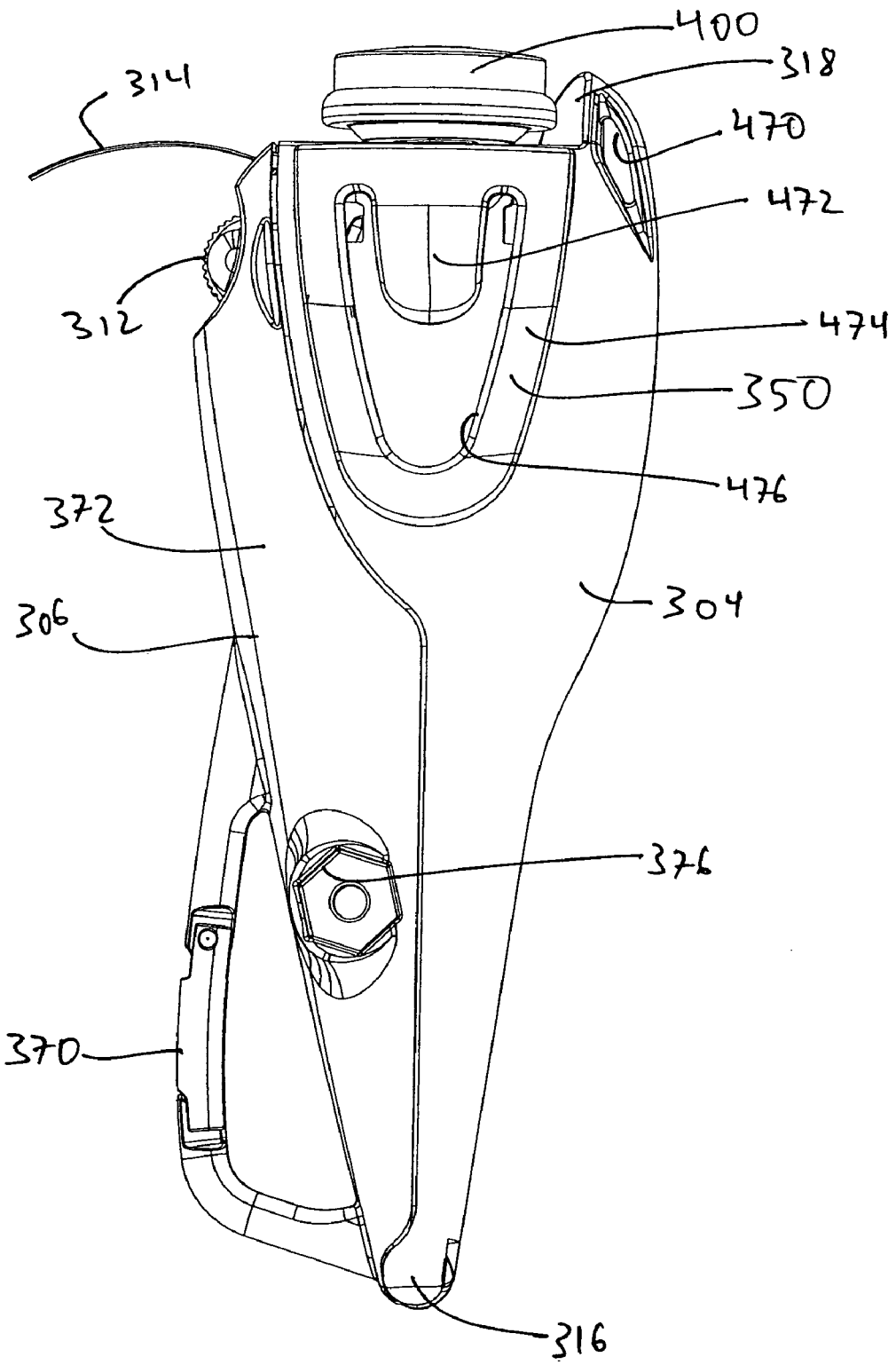
FIG. 14 is a rear perspective view of the embodiment of FIG. 13.
Figure 15:
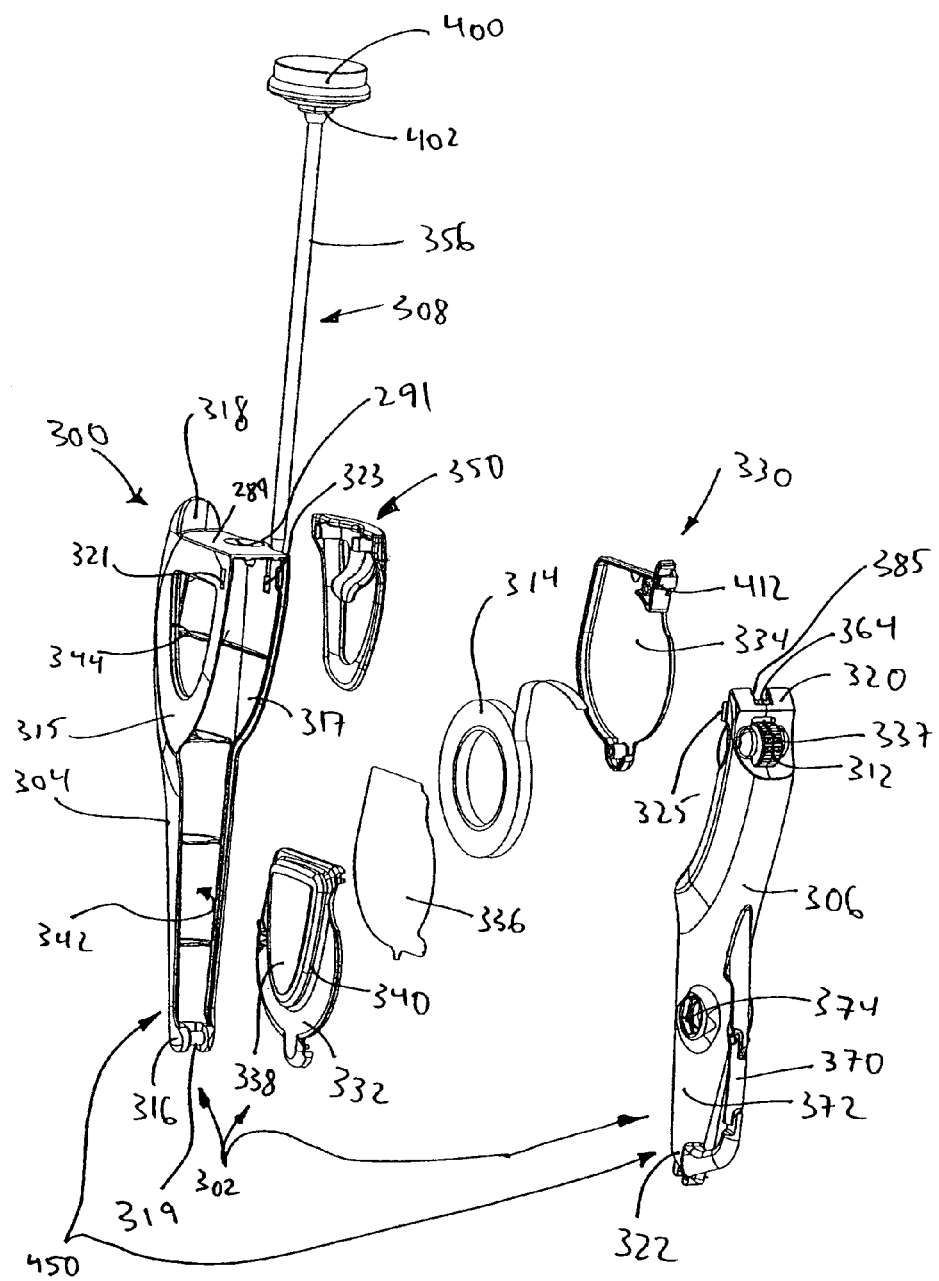
FIG. 15 is a partially exploded view of the assembly of FIG. 13.
Figure 18:
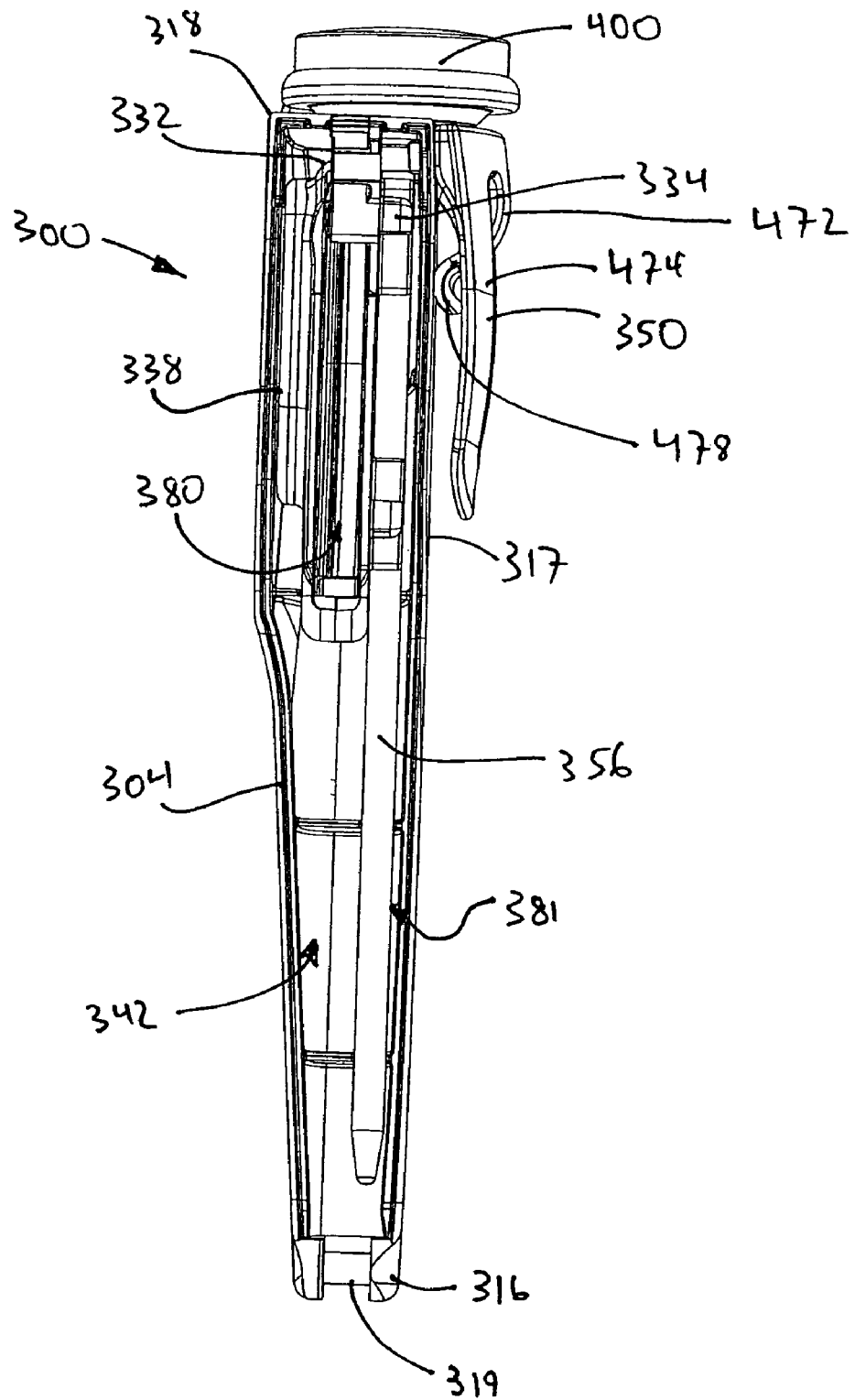
FIG. 18 is a side elevational view of the assembly of FIG. 14 with the subassembly shown in FIG. 17 removed.

Referring to FIGS. 14, 15 and 18, clip member 350 is a molded plastic, flexible yet resilient member that mechanically and removably fastens to an external surface of wall member 317 and includes a central clip member 471 and an outer clip arm 474. Outer arm 474 extends from the portion of clip member 350 that secures to wall 317 and is generally parallel to and slightly spaced apart from wall 317. Outer arm 474 forms a loop that defines an opening 476 (see FIG. 14). Central member 472 extends from the portion of clip member 350 that secures to wall 317 and within the opening 476 formed by arm 474. A distal end 478 of member 472 contacts the external surface of wall 317. Thus, arm 474 is operable to clip assembly 300 to a clip board or the like and member 478 can be used to CIP to a shirt, belt, pockets, etc. Optionally, clip member 350 can be removed.

Figure 13:
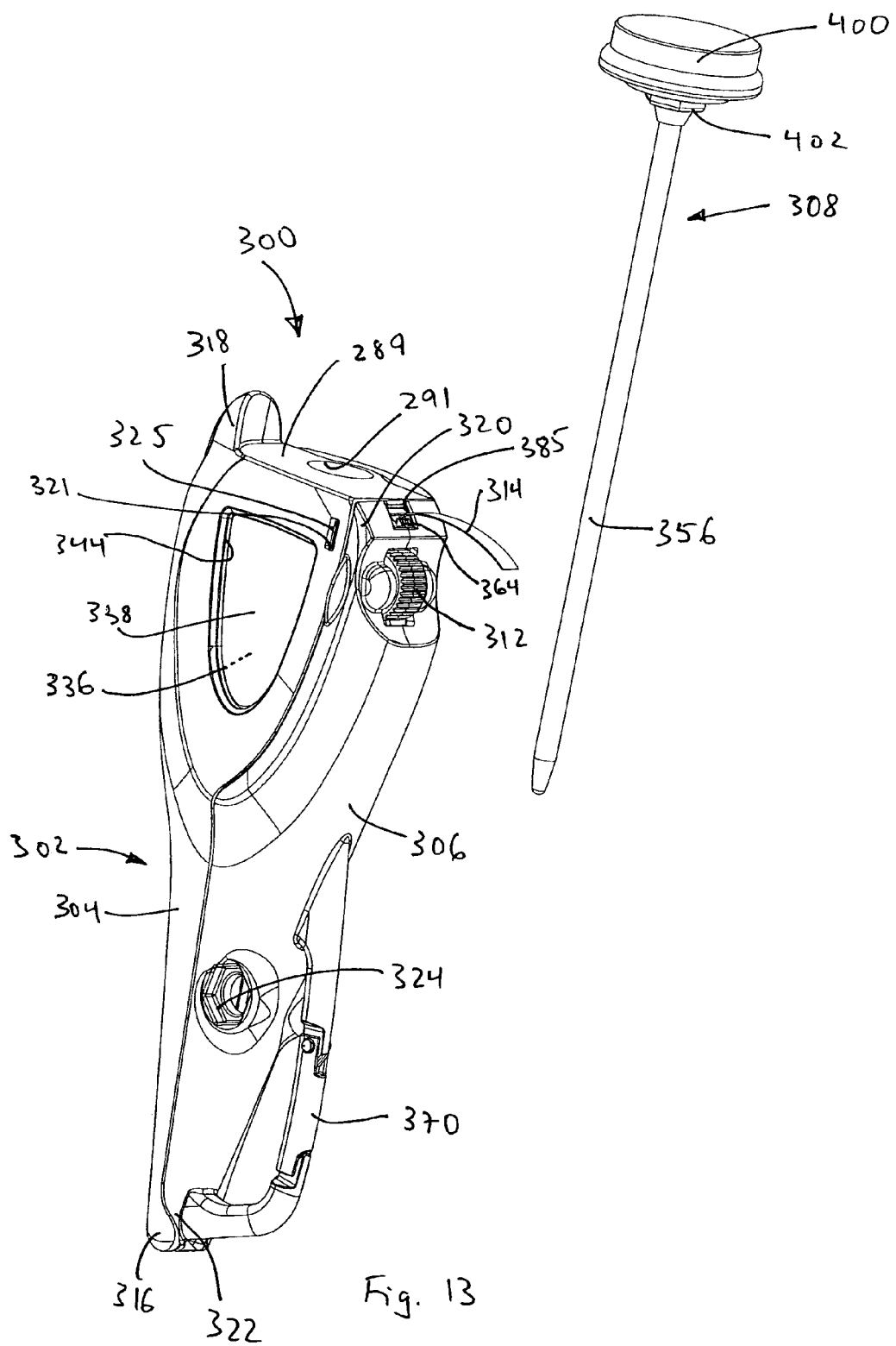
FIG. 13 is a perspective view of yet another inventive embodiment generally from a front orientation.
Figure 17:
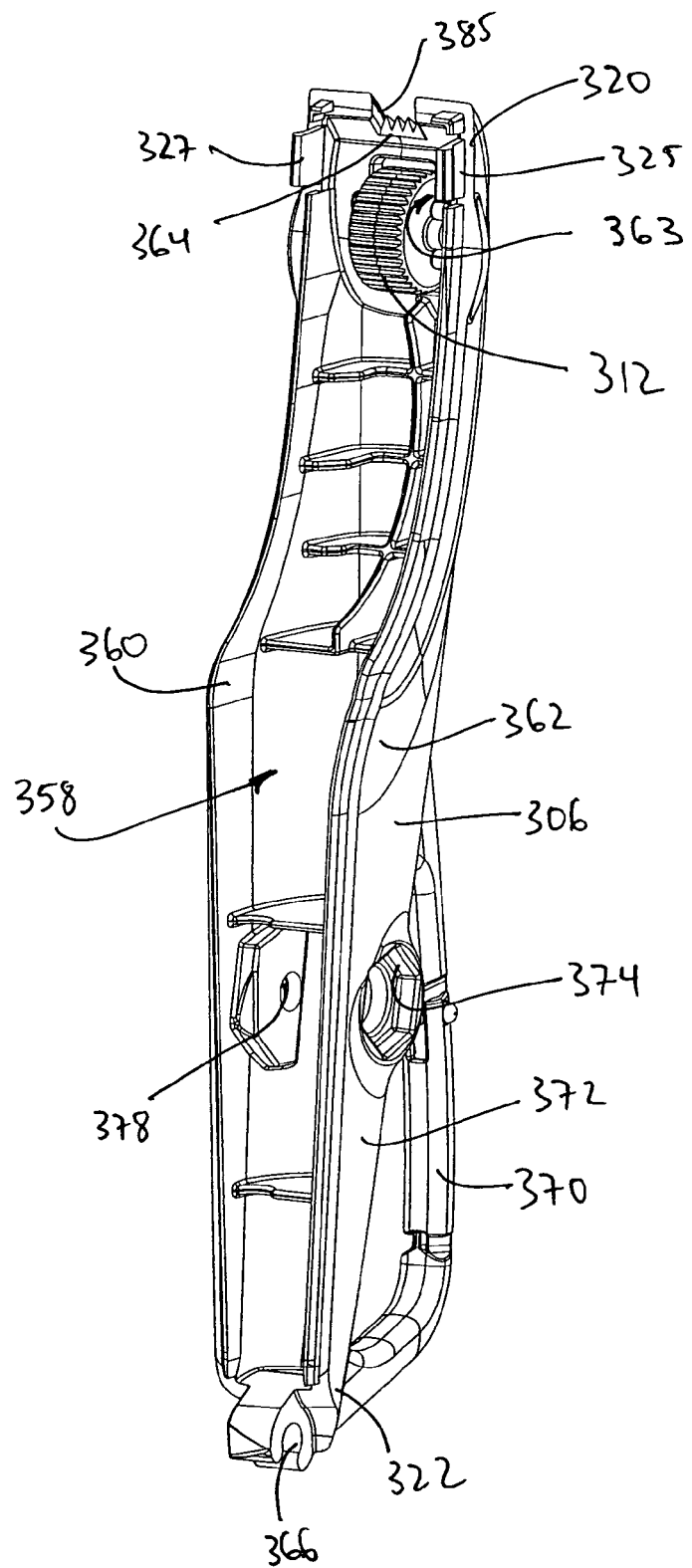
FIG. 17 is a perspective view of one of the housing members and related components of FIG. 15.

Referring still to FIGS. 13-15 and also to FIG. 17, second housing member or cover 306 is generally an elongated member extending between first and second ends 322 and 320, respectively, and forms a channel or second cavity (see FIG. 17) 358 that opens to one side that includes oppositely facing front and rear wall members 360 and 362, respectively, that are separated by channel or cavity 358. At second end 320, member 306 forms a space 363 for mounting a roller wheel member 312 for rotation about an axis (not illustrated or labeled) that is generally perpendicular to the length dimension of member 306. An opening 337 (see FIG. 15) is formed through member 306 adjacent an opening into space 363 so that when wheel 312 is mounted in space 363, a surface thereof is exposed through opening 337. A notch or slot 385 is formed in the peripheral edge of member 306 and a serrated edge 364 is provided within the notch 385.

At first end 322, member 306 forms an annular channel 366 open at both ends and to one side that is dimensioned to receive pivot dowel 319 in a friction fit manner. A carabineer type clip member 370 is pivotally mounted near first end 322 on a side of member 306 opposite channel 358 for, if desired, clipping the entire configuration 300 to a bucket handle, a belt clip, a wire shelf member, etc.

About one third of the way between ends 322 and 320, an external surface 372 of member 306 forms first and second oppositely facing hex shaped keyed calibration recesses 374 and 376, respectively. A through hole 378 extends through member 306 and is centrally aligned with each of recesses 374 and 376. Hole 378 is dimensioned to pass thermometer shaft 356.

The peripheral edges of members 304 and 306 that define channels 342 and 358, respectively, compliment each other so that when member 304 is closed with respect to member 304, cavities 342 and 358 form a compartment 381 (see FIG. 18).

Figure 16:
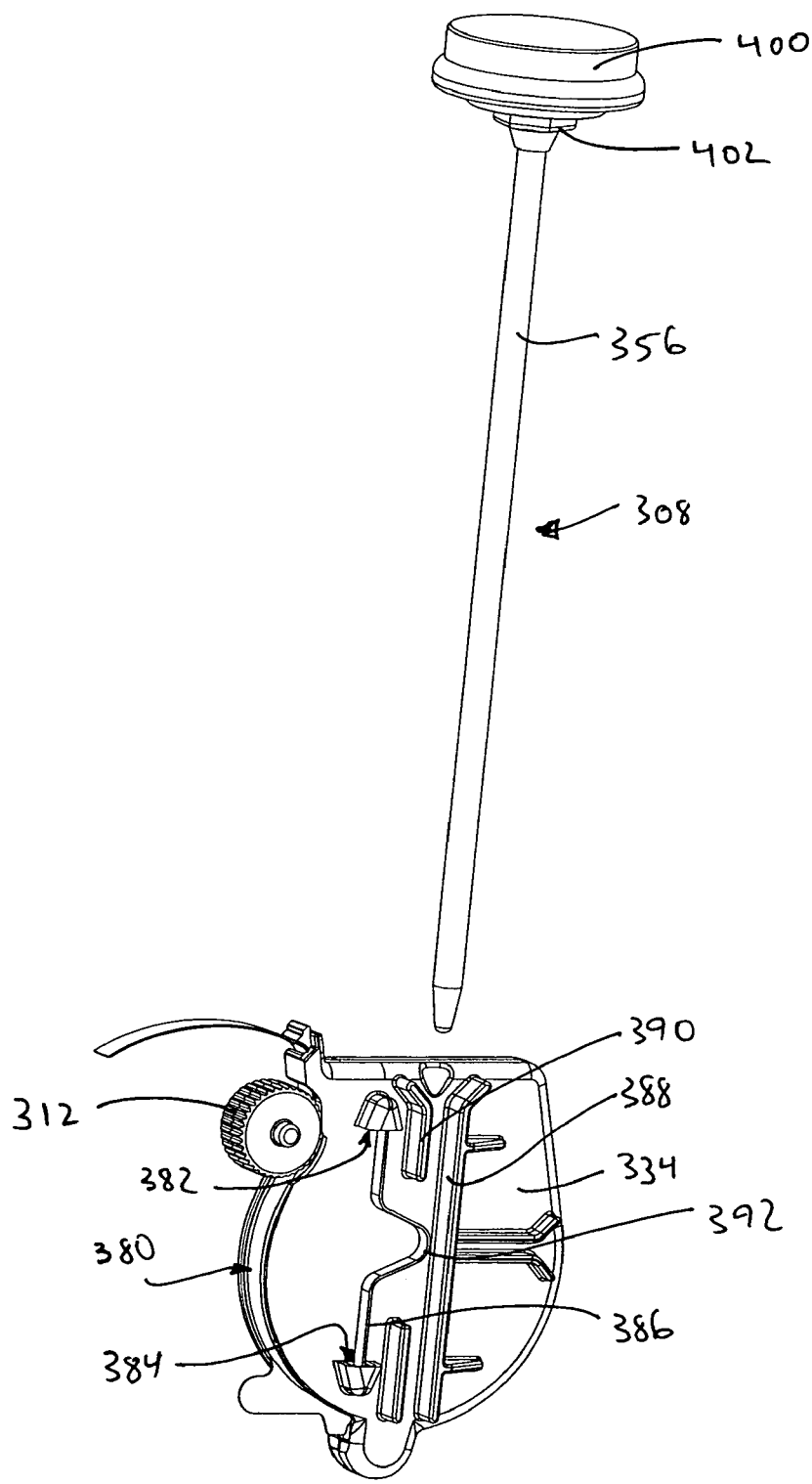
FIG. 16 is a view showing a subset of the components of FIG. 15.

Internal housing subassembly 330 includes first and second internal housing members 332 and 334, respectively, a printed scale sheet or member 336 and a test material roll 314. Housing members 332 and 334 are clam shell type members that mate as best illustrated in FIG. 16 to form a cavity or other compartment 380 for receiving roll 314. One end of compartment 380 is open so that a roll 314 can be inserted or removed therethrough. Hereinafter, compartments 380 and 381 will be referred to as first and second compartments, respectively.

First internal housing member 332 includes a raised portion 340 that has a peripheral edge that mirrors the shape of opening 344 formed by wall member 315. Raised portion 340, in at least some embodiments, is clear or transparent so that when portion 340 is located within opening 344, a window 338 is provided.

Referring to FIG. 16, a rear surface of second internal housing member 334 forms facing spring end receiving recesses 382 and 384 for receiving opposite ends of a retaining member or leaf spring 386. The rear surface also forms shaft guiding structure 388 and 390 for guiding a thermometer shaft 356. Leaf spring 386 includes a central bowed section 392 that, when spring 386 is mounted in recesses 382 and 384, extends at least partially into the guidance space between structure 388 and 390. Thus, when shaft 358 is placed between structure 388 and 390, central section 392 places force on shaft 358 to operate as a friction element to hold shaft 356 in place unless affirmatively removed.

On a side opposite the rear surface, second internal housing member 334 forms a strip material guide 412 for, as the label implies, guiding a loose end of the strip material that forms roll 314.

Scale sheet 336, as the label implies, is simply a sheet of paper or thin plastic on which a color scale or the like is printed for comparison to used test strips. Sheet 336 is sized and dimensioned to be received in the cavity formed by members 332 and 334 along side a roll 314 and adjacent clear window 338 so that the scale information can be viewed through window 338.

Thermometer 308 includes, in addition to shaft 356, a head member 400 and a keyed calibration hex member 402 between the head member 400 and the shaft 356. By turning hex member 402 with respect to head member 400, thermometer 308 can be calibrated. Here, the hex recesses 374 and 376

(see again FIGS. 14 and 17) formed by external surface 372 of member 306 are dimensioned to receive two differently dimensioned hex members 402 because different thermometers typically have only one of two sizes of hex members 402. To calibrate a thermometer, the thermometer shaft 308 is passed through hole 378 until the hex member 402 is received in the suitably sized hex recess 374 or 376. Next, the head 400 is held stationary while member 306 (and also member 304) are rotated until calibration has been achieved.

Once cartridge subassembly 330 is assembled, subassembly 330 is inserted into channel 342 proximate second end 318 so that raised portion 340 snap fits into opening 344 with the open side of the cartridge compartment facing out of cavity 342 and with guide 412 located within the open side of cavity 342 at end 318. Next, dowel 319 is snap fit into channel 366 to secure cover 306 to housing 304 with cavities 342 and 358 facing each other. A loose end of roll 314 is pulled and fed through guide 412 formed by member 334. Cover 306 is rotated toward member 304 until tabs 325 and 327 are received in openings 321 and 323 to close members 304 and 306. The complimentary peripheral edges of members 304 and 306 are aligned and notch 385 forms an opening proximate guide 412 so that the loose end of roll 314 can extend from notch 385 adjacent edge 364. A surface of roller wheel member 312 facing roll 314 contacts an external surface of roll 314 and thus, when roller wheel 312 is rotated, a length of roll 314 is dispersed. When member 306 is closed to member 304, serrated edge 364 is adjacent the end of guide 412 through which the strip material extends. Serrated edge 364 facilitates tearing of a portion of the strip from roll 314.

Referring again to FIGS. 15 and 16, after subassembly 330 is inserted into channel or cavity 342, opening 291 is aligned with the space/channel formed between structure 388 and 390. Thus, when shaft 356 is inserted into opening 291, shaft 356 is aligned with and passes between structure 388 and 390 and hence contacts central bowed portion 392 and a friction force is applied to shaft 356 tending to retain shaft 356 in the inserted position unless an affirmative force is applied to remove the thermometer 308. Here, it was recognized that spring 386 is necessary as different thermometers having different shaft 356 diameters may be employed with this embodiment and a friction fit alone cannot accommodate multiple shaft dimensions.

Referring again to FIG. 15 and also to FIG. 18, it should be appreciated that after the housing subassembly 302 is assembled, the housing 302 forms first and second separate compartments 380 and 381, respectively, for receiving the thermometer shaft 356 and the roll 314 (not shown in FIG. 18).

After a test material roll 314 has been completely used, a new roll 314 can be loaded into compartment 380 by releasing end 320 of member 306 and rotating member 306 about dowel 319 from the closed position to an open position to expose the open side of compartment 380 (see FIG. 18).

Figure 10:
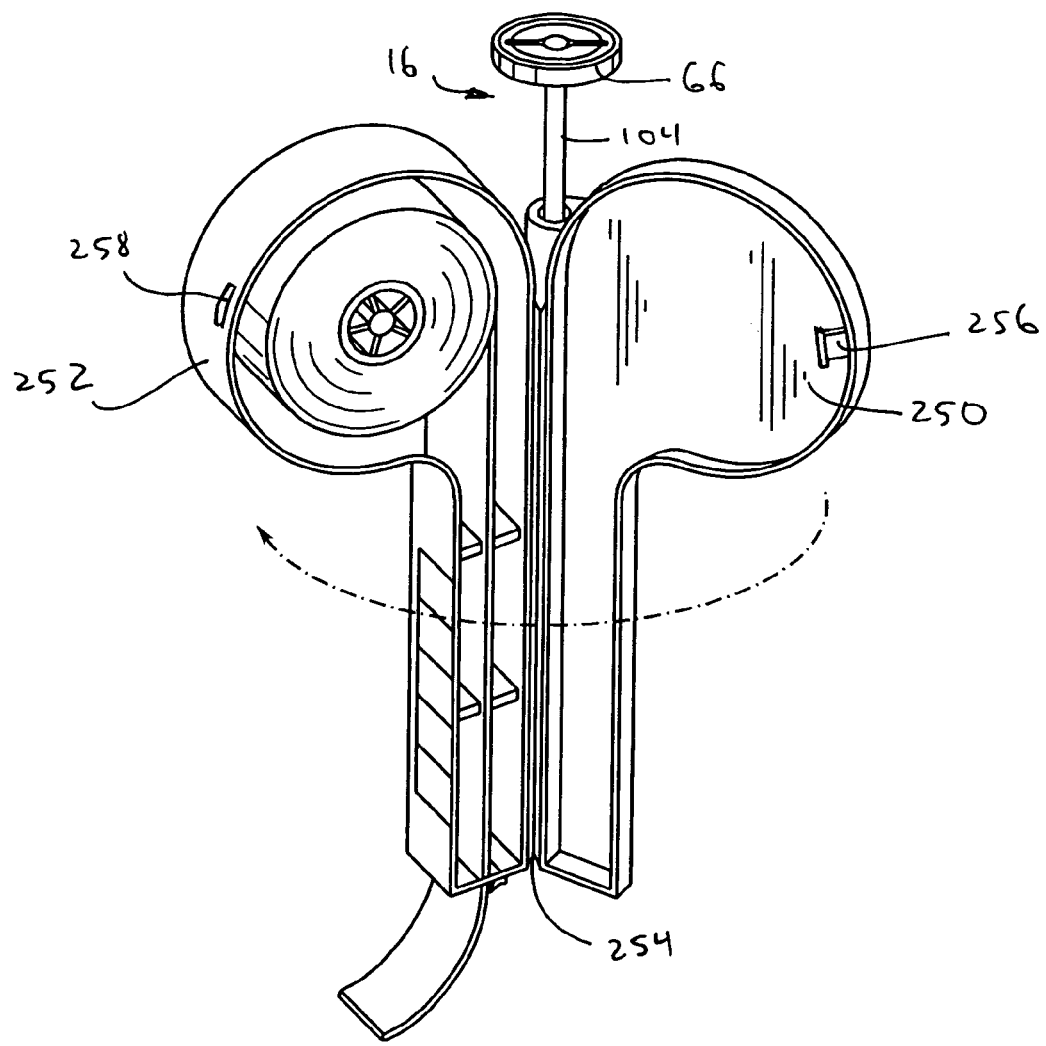
FIG. 10 is a perspective view illustrating a dispenser similar to the dispenser illustrated in FIGS. 4 and 5, albeit where a cover member is attached via a living hinge to a container member.

From the foregoing, it will be observed that numerous modifications and variations can be effective without departing from the true spirit and scope of the present invention. It will be appreciated that the present disclosure is intended as an exemplification of the invention, and is not intended to limit the invention to the specific embodiments illustrated. The disclosure is intended to cover by the appended claims all such modifications that fall within the scope of the claims. For example, while each of the embodiments described above teaches a housing sub-assembly that includes two parts, a cavity forming part and a cover part, in at least some embodiments, the cover part may be integrally formed with the cavity receiving part via a living hinge or the like. In this regard, see FIG. 10 that shows an embodiment similar to the embodiment of FIGS. 4 and 5 where a cover member 250 is mounted to a container member 252 via a living hinge 254. Here, a single arm member 256 may be provided to interact with a single slot 258 for closing purposes.

In addition, while all of the embodiments above show a cover member forming a thermometer receiving passageway, in at least some embodiments the thermometer receiving passageway may be formed by the container member instead of the cover member. Moreover, any of the embodiments above may be formed via two mirror image clam type container members instead of a container member and a cover member. To this end, see the embodiment illustrated in FIG. 10 where cover member 250 is a clam shell type member.

Furthermore, the indexing sub-assembly illustrated in FIGS. 1 through 3 may be provided as an additional feature for any of the sub-assemblies illustrated in FIGS. 4 and 5, 7, 8 or 9. Moreover, in at least some embodiments, it may not be necessary or desirable to provide an indexing sub-assembly in the embodiment illustrated in FIGS. 1 through 3 and instead, a simple assembly wherein a user has to pull test material through a slot may be used.

Figure 11:
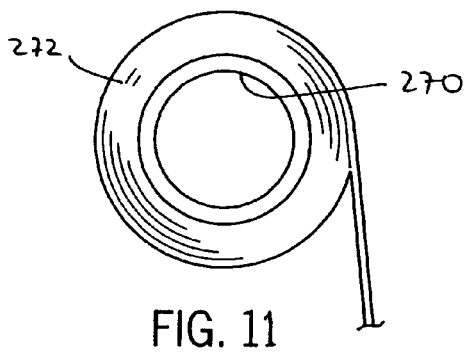
FIG. 11 is a plan view of a roll of test material wound about a cardboard hub.
Figure 12:
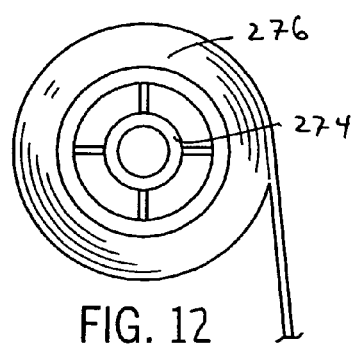
FIG. 12 is similar to FIG. 11, albeit illustrating material wound about an axel/spool.

In addition, in at least some embodiments roll test material may be tightly wound without a hub or spool at its center as best illustrated in FIG. 2 while in other embodiments a cardboard hub or a roll on an axel/spool may be employed as illustrated in FIGS. 11 and 12, respectively. In FIG. 11, a cardboard hub 270 is provided with a roll of ribbon type test material 272 wound thereon. In FIG. 12, an axel/spool 274 is provided with a ribbon type roll of test material 276 wound thereon. Furthermore, in at least some embodiments a roll mounting post like post 42 in FIG. 2 may not be provided where a cylindrical roll of test material is used and instead the roll may simply reside within the cylindrical cavity portion 30 and roll generally about an axis as the ribbon material is indexed.

Moreover, while non-electrical thermometers may be employed, in at least some cases the thermometer may be electronic and provide a digital readout. In the case of an electronic thermometer, a clock/alarm function may be included with the thermometer that generates an audible or visual indication when testing should occur. For instance, when a solution is first mixed, an assembly user may be required to activate the thermometer clocking function which would immediately cause the thermometer to generate an indication that temperature should be tested. After temperature is tested, the clocking function could then count down to the next time at which the temperature should be tested (e.g., 30 minutes) and generate an audible or visual (e.g., an LED) indication. This process could continue until the solution is discarded. In addition, where temperatures are read via an electronic thermometer, in at least some cases, the thermometer could be programmed to store the temperatures and associated times for subsequent use (e.g., downloading to a data log). In other cases a clocking/alarm sub-assembly may be provided as part of the housing sub-assembly instead of as part of the thermometer.

Referring again to FIGS. 13-18, it should be appreciated that assembly 300 includes multiple features for attaching to any of several different items such as clip boards, shelves, belts, pockets, key chains, necklaces, etc. For instance, assembly 300 includes clip member 350, hole 470 and carabineer clip 370. Thus, it is extremely convenient to store assembly 300 in any of several different and handy ways.

Thus, the invention is to cover all modifications, equivalents, and alternatives falling within the spirit and scope of the invention as defined by the following appended claims.

To apprise the public of the scope of this invention, the following claims are made:

What is claimed is:

1. An assembly comprising:
   a thermometer;
   a substantially flat test strip material that is impregnated with a chemical known to interact with a cleaning sanitizer; and
   a housing that forms first and second separate compartments for receiving the test strip material and releasably receiving the thermometer, respectively;
   wherein the housing includes a first housing member and a second housing member that form first and second cavities, at least one of the cavities at least in part forming the second compartment;
   wherein the housing further includes an internal housing subassembly that includes at least a first internal housing member mounted at least in part within the second compartment to at least in part separate the first compartment from the second compartment;
   wherein the internal housing subassembly further includes a second internal housing member mounted at least in part within the second compartment that cooperates with the first internal housing member to separate the first compartment from the second compartment; and
   wherein the first and second internal housing members are secured within the first cavity via a friction fit.

2. The assembly of claim 1 wherein the housing forms a slot that opens out of the first compartment through which one end of the test strip material is fed.

3. The assembly of claim 2 for use with test strip material including at least one end wherein the first compartment includes compartment wall surfaces that guide the at least one end of the strip material toward the slot when the material is within the first compartment.

4. The assembly of claim 3 for use with test strip material in the form of a roll and wherein at least a first part of the first compartment is cylindrical.

5. The assembly of claim 4 wherein a second part of the first compartment is elongated and extends from the first part of the first compartment and wherein the slot is provided at a distal end of the second part of the first compartment.

6. The assembly of claim 5 wherein the second part of the first compartment extends along a trajectory that is aligned with the center of the cylindrical first part.

7. The assembly of claim 2 further including a blade proximate the slot for cutting the strip material into sheets.

8. The assembly of claim 1 wherein the thermometer includes an elongated shaft and a head at a proximal end of the shaft and wherein the second compartment includes an elongated passageway open at, at least, one end for receiving the thermometer.

9. The assembly of claim 1 further including a color scale located on an external surface of the housing.

10. The assembly of claim 1 further including a clip extending from an external surface of the housing.

11. The assembly of claim 10 further including a through hole in the housing for attaching to a strand.

12. The assembly of claim 10 further including a carabineer type clip at least in part formed by the housing.

13. The assembly of claim 12 further including a through hole in the housing for attaching to a strand.

14. The assembly of claim 1 further including a carabineer type clip at least in part formed by the housing.

15. The assembly of claim 1 wherein the first and second cavities together form the second compartment.

16. The assembly of claim 1 wherein the second housing member is mounted to the first housing member for pivotal movement between an open position and a closed position.

17. The assembly of claim 1 wherein at least a portion of at least one of the internal housing members is transparent, the assembly further including a scale member receivable within the first compartment and that is viewable through the transparent portion of the internal housing member.

18. The assembly of claim 1 wherein the first housing member forms an opening into the first cavity and wherein at least a portion of the transparent portion of the internal housing member is received within the opening.

19. The assembly of claim 1 wherein at least a portion of the housing is transparent, the assembly further including a scale member receivable adjacent the transparent portion of the housing so that at least a portion of the scale member is viewable through the transparent portion.

20. The assembly of claim 19 wherein the scale member is received in the first compartment along with the strip material.

21. The assembly of claim 1 wherein the strip material includes a roll of strip material.

22. The assembly of claim 21 wherein the first and second housing members include complimentary peripheral edges along the cavities that align when the second housing member is closed to the first housing member, at least one of the housing members forming a notch in the peripheral edge with a loose end of the roll of strip material extending through the notch.

23. The assembly of claim 22 wherein at least one of the housing members forms a serrated edge adjacent the notch.

24. The assembly of claim 1 wherein the thermometer includes a keyed calibration member and the housing forms a keyed calibration recess for receiving the keyed calibration member.

25. The assembly of claim 24 wherein the keyed calibration member and recess are hexagonal in shape.

26. The assembly of claim 24 wherein the housing forms at least first and second keyed calibration recesses of different dimensions for receiving at least two differently sized keyed calibration members.

27. An assembly comprising:
   a thermometer;
   a substantially flat test strip material that is impregnated with a chemical known to interact with a cleaning sanitizer;
   an internal housing that forms a first compartment for receiving the test strip material; and
   an external housing that forms a second compartment for receiving the internal housing and releasably receiving at least a portion of the thermometer;
   wherein external housing includes first and second external housing members that form first and second cavities, respectively, where the first and second cavities together form the second compartment, the internal housing mounted at least in part within the first cavity and at least partially exposed when the second external housing member is in the open position.

28. The assembly of claim 27 wherein each of the internal and external housings form openings through which a loose end of the test strip material extends.

29. The assembly of claim 27 wherein the internal housing is substantially open to one side and wherein the open side is exposed when the second external housing member is in the open position.

30. The assembly of claim 29 wherein the test strip material forms a roll of strip material.

31. The assembly of claim 30 further including a retaining member supported by one of the housing members and that extends at least part way into the second compartment for impeding removal of the thermometer when the thermometer is received within the second compartment.

32. The assembly of claim 31 wherein the retaining member includes a leaf spring.

33. The assembly of claim 32 wherein the leaf spring is supported by internal housing.

34. The assembly of claim 33 wherein the portion of the thermometer received in the second compartment includes a thermometer shaft.

35. The assembly of claim 27 wherein at least a portion of at least one of the internal housing is transparent, the assembly further including a scale member received in the first compartment and at least partially viewable through the transparent portion.

36. The assembly of claim 35 wherein the external housing forms an opening, at least a portion of the transparent portion of the internal housing aligned with the opening so that the scale member is viewable through the opening.

37. The assembly of claim 27 wherein the thermometer includes a keyed calibration member and the external housing forms a keyed calibration recess for receiving the keyed calibration member.

38. The assembly of claim 37 wherein the keyed calibration member and recess are hexagonal in shape.

39. The assembly of claim 37 wherein the external housing forms at least first and second keyed calibration recesses of different dimensions for receiving at least two differently sized keyed calibration members.

40. An assembly comprising:
a thermometer;
a substantially flat test strip material that is impregnated with a chemical known to interact with a cleaning sanitizer;
an internal housing that forms a first compartment for receiving the test strip material; and
an external housing that forms a second compartment for receiving the internal housing and releasably receiving at least a portion of the thermometer;
wherein external housing includes first and second external housing members that form first and second cavities, respectively, where the first and second cavities together form the second compartment, the first and second external housing members including complimentary peripheral edges along the cavities that align when the second external housing member is closed to the first external housing member, at least one of the external housing members forming a notch in the peripheral edge with a loose end of the roll of strip material extending through the notch.

41. The assembly of claim 40 wherein at least one of the external housing members forms a serrated edge adjacent the notch.

42. The assembly of claim 40 further including a color scale located on an external surface of at least one of the housings.

43. The assembly of claim 40 wherein at least a portion of at least one of the internal housing and the external housing is transparent, the assembly further including a scale member receivable adjacent the transparent portion of the housing so that at least a portion of the scale member is viewable through the transparent portion.

44. The assembly of claim 40 wherein the thermometer includes a keyed calibration member and the external housing forms a keyed calibration recess for receiving the keyed calibration member.

45. The assembly of claim 44 wherein the keyed calibration member and recess are hexagonal in shape.

46. The assembly of claim 44 wherein the external housing forms at least first and second keyed calibration recesses of different dimensions for receiving at least two differently sized keyed calibration members.

* * * * *